United States Patent
Öhman et al.

(10) Patent No.: US 10,994,525 B2
(45) Date of Patent: May 4, 2021

(54) METHOD FOR MANUFACTURING A LAMINATED PACKAGING MATERIAL, THE LAMINATED PACKAGING MATERIAL AND PACKAGING CONTAINERS MADE THEREFROM

(71) Applicant: Tetra Laval Holdings & Finance S.A., Pully (CH)

(72) Inventors: Peter Öhman, Lund (SE); Alain Collaud, St-Aubin (CH); Mikael Berlin, Lund (SE); Joakim Balogh, Lund (SE); Teresa Ewing, Lomma (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/779,336

(22) PCT Filed: Nov. 25, 2016

(86) PCT No.: PCT/EP2016/078753
§ 371 (c)(1),
(2) Date: May 25, 2018

(87) PCT Pub. No.: WO2017/089506
PCT Pub. Date: Jun. 1, 2017

(65) Prior Publication Data
US 2018/0304607 A1     Oct. 25, 2018

(30) Foreign Application Priority Data

Nov. 27, 2015 (EP) .................................. 15196873

(51) Int. Cl.
*B32B 37/20* (2006.01)
*B32B 7/12* (2006.01)
(Continued)

(52) U.S. Cl.
CPC ............... *B32B 37/20* (2013.01); *B32B 5/16* (2013.01); *B32B 5/32* (2013.01); *B32B 7/12* (2013.01);
(Continued)

(58) Field of Classification Search
CPC ....... B32B 37/12; B32B 37/20; B32B 37/203; B32B 37/1284; B32B 2037/1276;
(Continued)

(56) References Cited

U.S. PATENT DOCUMENTS 4,596,633 A * 6/1986 Attwood .............. D21G 1/0093
100/153
5,573,640 A * 11/1996 Frederick .................. D01F 8/02
162/146

(Continued)

FOREIGN PATENT DOCUMENTS

EP    2206658 A1 * 7/2010 ............... B65D 1/36
EP    2 949 597 A1   12/2015
(Continued)

OTHER PUBLICATIONS

International Search Report (PCT/ISA/210) dated Mar. 15, 2017, by the European Patent Office as the International Searching Authority for International Application No. PCT/EP2016/078753.
(Continued)

*Primary Examiner* — John L Goff, II
(74) *Attorney, Agent, or Firm* — Buchanan Ingersoll & Rooney PC

(57) ABSTRACT

The present invention relates to a method for manufacturing of a laminated cellulose-based liquid or semi-liquid food packaging material, wherein the laminated packaging material has a bulk material layer, wherein a further sheet is laminated to the bulk material layer by an aqueous adhesive composition. The invention further relates the laminated
(Continued)

Figure 1A:
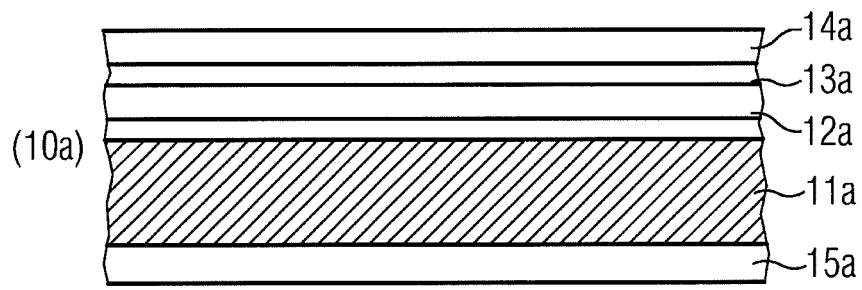

packaging materials obtained by the method and to a packaging container for liquid food packaging, comprising the laminated packaging material or being made from the laminated packaging material obtained by the method.

19 Claims, 6 Drawing Sheets

(51) Int. Cl.

| | |
|---|---|
| B32B 37/12 | (2006.01) |
| B32B 29/00 | (2006.01) |
| B32B 5/32 | (2006.01) |
| B32B 27/36 | (2006.01) |
| B32B 27/10 | (2006.01) |
| B32B 15/12 | (2006.01) |
| B32B 15/085 | (2006.01) |
| B32B 27/30 | (2006.01) |
| B32B 27/32 | (2006.01) |
| B32B 29/08 | (2006.01) |
| B32B 27/34 | (2006.01) |
| B32B 27/06 | (2006.01) |
| B32B 5/16 | (2006.01) |
| B32B 15/20 | (2006.01) |
| B32B 15/04 | (2006.01) |
| B32B 27/08 | (2006.01) |

(52) U.S. Cl.
CPC .......... *B32B 15/046* (2013.01); *B32B 15/085* (2013.01); *B32B 15/12* (2013.01); *B32B 15/20* (2013.01); *B32B 27/065* (2013.01); *B32B 27/08* (2013.01); *B32B 27/10* (2013.01); *B32B 27/306* (2013.01); *B32B 27/32* (2013.01); *B32B 27/325* (2013.01); *B32B 27/327* (2013.01); *B32B 27/34* (2013.01); *B32B 27/36* (2013.01); *B32B 29/002* (2013.01); *B32B 29/005* (2013.01); *B32B 29/007* (2013.01); *B32B 29/08* (2013.01); *B32B 37/1284* (2013.01); *B32B 37/203* (2013.01); *B32B 2037/1215* (2013.01); *B32B 2037/1276* (2013.01); *B32B 2255/10* (2013.01); *B32B 2255/12* (2013.01); *B32B 2255/20* (2013.01); *B32B 2255/205* (2013.01); *B32B 2255/26* (2013.01); *B32B 2266/02* (2013.01); *B32B 2270/00* (2013.01); *B32B 2307/31* (2013.01); *B32B 2307/402* (2013.01); *B32B 2307/406* (2013.01); *B32B 2307/412* (2013.01); *B32B 2307/514* (2013.01); *B32B 2307/518* (2013.01); *B32B 2307/538* (2013.01); *B32B 2307/54* (2013.01); *B32B 2307/546* (2013.01); *B32B 2307/718* (2013.01); *B32B 2307/72* (2013.01); *B32B 2307/7242* (2013.01); *B32B 2307/7244* (2013.01); *B32B 2307/7248* (2013.01); *B32B 2307/7265* (2013.01); *B32B 2307/748* (2013.01); *B32B 2307/75* (2013.01); *B32B 2309/14* (2013.01); *B32B 2439/46* (2013.01); *B32B 2439/62* (2013.01); *B32B 2439/70* (2013.01)

(58) Field of Classification Search
CPC ..... B32B 2439/70; B32B 15/12; B32B 27/10; B32B 29/002; B32B 29/005; B32B 29/007; B32B 29/08; B32B 2439/46; B32B 2439/62; B32B 7/12; B32B 2255/12; B32B 2307/31; B32B 2309/14; B29C 65/10; B29C 65/103; B29C 65/106
USPC .................................................. 156/322, 324
See application file for complete search history.

(56) References Cited

U.S. PATENT DOCUMENTS

| | | | | |
|---|---|---|---|---|
| 6,066,688 | A | * | 5/2000 | Samonides, Sr. ....... C09J 133/08 524/272 |
| 6,652,984 | B2 | * | 11/2003 | Finestone ............... B32B 27/08 428/480 |
| 6,692,801 | B1 | * | 2/2004 | Berlin ..................... B32B 27/10 428/34.2 |
| 6,821,373 | B1 | | 11/2004 | Berlin et al. |
| 10,328,666 | B2 | | 6/2019 | Nyman et al. |
| 2005/0100252 | A1 | * | 5/2005 | Rivlin ..................... B32B 27/10 383/116 |
| 2005/0112345 | A1 | * | 5/2005 | Kavasch ................. B32B 27/10 428/216 |
| 2011/0132975 | A1 | | 6/2011 | Toft et al. |
| 2018/0305098 | A1 | | 10/2018 | Nyman et al. |
| 2018/0311940 | A1 | | 11/2018 | Toft et al. |
| 2018/0319559 | A1 | | 11/2018 | Toft et al. |
| 2018/0354690 | A1 | | 12/2018 | Collaud et al. |
| 2019/0202191 | A1 | | 7/2019 | Toft et al. |

FOREIGN PATENT DOCUMENTS

| | | | |
|---|---|---|---|
| JP | H11-514595 A | 12/1999 | |
| RU | 2 487 065 C2 | 7/2013 | |
| RU | 2 540 605 C2 | 2/2015 | |
| WO | 97/16312 A1 | 5/1997 | |
| WO | WO 01/17771 A1 | 3/2001 | |
| WO | WO 2011/003566 A1 | 1/2011 | |
| WO | WO-2011003566 A1 * | 1/2011 | ............. B32B 27/10 |
| WO | WO 2015/140097 A1 | 9/2015 | |

OTHER PUBLICATIONS

U.S. Appl. No. 15/779,323, filed May 25, 2018 entitled "Packaging Material and Packaging Container," published as U.S. Application Publication No. US 2018/0305098.
U.S. Appl. No. 15/779,358, filed May 25, 2018 entitled "Laminated Packaging Material, Packaging Containers Manufactured Therefrom," published as U.S. Application Publication No. US 2018/0311940.
U.S. Appl. No. 15/779,205, filed May 25, 2018 entitled "Method of Manufacturing a Laminated Packaging Material, The Packaging Material Obtained by the Method and Packaging Containers Manufactured Therefrom," published as U.S. Application Publication No. US 2019/0202191.
U.S. Appl. No. 15/780,329, filed May 31, 2018 entitled "Laminated Packaging Material, Packaging Containers Manufactured Therefrom and a Method for Manufacturing the Laminate Material," published as U.S. Application Publication No. US 2018/0354690.
U.S. Appl. No. 15/779,285, filed May 25, 2018 entitled "Laminated Packaging Material, Packaging Containers Manufactured Therefrom and a Method for Manufacturing the Laminate Material," published as U.S. Application Publication No. US 2018/0319559.
Search Report dated Apr. 15, 2020, by the Russian Patent Office in corresponding Russian Patent Application No. 2018123164/04(036703). (2 pages).
Office Action (Notice of Reasons for Refusal) dated Oct. 19, 2020, by the Japanese Patent Office in corresponding Japanese Patent Application No. 2018-527140 and an English Translation of the Office Action. (6 pages).

* cited by examiner

METHOD FOR MANUFACTURING A LAMINATED PACKAGING MATERIAL, THE LAMINATED PACKAGING MATERIAL AND PACKAGING CONTAINERS MADE THEREFROM

TECHNICAL FIELD

The present invention relates to a method for manufacturing a laminated packaging material, and to the laminated packaging material obtainable by the method.

Furthermore, the invention relates to packaging containers comprising the laminated packaging material or being made of the laminated packaging material in its entirety. In particular, the invention relates to packaging containers intended for liquid food packaging, comprising the laminated packaging material.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable thermoplastic polymers, such as adhesive polymers and/or polyolefins. Also on the outside of the bulk layer, there is an outermost heat sealable polymer layer.

The packaging containers are generally produced by means of modern, high-speed packaging machines of the type that form, fill and seal packages from a web or from prefabricated blanks of packaging material.

Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean conditions such that the filled package may be stored for a long time even at ambient temperature, without the risk of growth of micro-organisms in the filled product. Another important advantage of the Tetra Brik®-type packaging method is, as stated above, the possibility of continuous high-speed packaging, which has considerable impact on cost efficiency.

Packaging containers for sensitive liquid food, for example milk or juice, can also be produced from sheet-like blanks or prefabricated blanks of the laminated packaging material of the invention. From a tubular blank of the packaging laminate that is folded flat, packages are produced by first of all building the blank up to form an open tubular container capsule, of which one open end is closed off by means of folding and heat-sealing of integral end panels. The thus closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The layer of an aluminium foil in the packaging laminate provides gas barrier properties quite superior to most polymeric gas barrier materials. The conventional aluminium-foil based packaging laminate for liquid food aseptic packaging is still the most cost-efficient packaging material, at its level of performance, available on the market today.

Any other material to compete with such foil-based materials must be cost-efficient regarding raw materials, have comparable food preserving properties, be sufficiently mechanically stable and have a comparably low complexity in the converting into a finished packaging laminate.

Decreasing the costs of today's packaging material further, can be made by down-gauging the thickness of the polymer layers or by seeking to replace the aluminium foil barrier by one or more different barrier layers, which has proven to be quite a challenge. A further way of saving costs, which has hitherto not been seen as practical in the field of liquid carton packaging, would be by down-gauging the cellulose-based bulk layer by type and/or amount of cellulose fibre material. It normally leads to the important properties of mechanical strength and packaging integrity, as well as material barrier properties, being jeopardized and has previously been considered as a less favourable way forward. The paperboard is a major part of liquid carton packaging material, however also representing a major part of the total packaging material costs.

A further requirement on future laminated packaging materials for liquid packaging containers is that the appearance of such packaging containers should be possible to differentiate to a higher degree, i.e. by providing new, interesting and appealing decorative or tactile features to attract consumers and retailers. Such features are for example, background effects to printed décor patterns such as gold metallisation or other different shiny colours, embossing and engraving features such as hologram decorations, tactile or relief surface effects, matte/glossy surfaces, etc. The increasing desire for such differentiation options is a challenge, since additions of features and materials normally, automatically entail higher costs of raw materials and/or manufacturing processes. Moreover, such specialty materials having shiny or glossy features or embossed features, are often sensitive materials which do not withstand high lamination pressures and temperatures.

DISCLOSURE OF THE INVENTION

It is now, considering the above, an object of the present invention to realise a new way of reducing costs of laminated cellulose-based liquid- or semi-liquid food packaging materials.

It is also a general object of the invention to provide a more cost-efficient method of laminating a cellulose-based packaging material providing sufficient mechanical stability as well as good barrier and integrity properties, which method fulfils the needs in liquid carton laminated packaging materials.

It is a further object of the invention to provide a method of manufacturing a low-cost laminated packaging material having an increased relative content of materials based on biological and renewable materials, i.e. from sources not exploiting fossil raw materials.

A yet further object, is to provide a method of laminating sensitive material layers to a cellulose-based bulk material layer or a paper substrate, without damaging the sensitive material, such as a substrate layer having a pre-made sensitive decorative feature, or a delicate barrier coating, provided thereon.

A further object, is to enable cost-efficient differentiation of the outside layers of a lamianted packaging material, i.e. the layers which will attract and appeal to consumers, on the outside of a packaging container. Such outside layers may according to the method of the invention easily be swapped, such that different decorative and/or tactile features may be laminated into the material, according to different desires among dariy and filler customers, consumers and retailers. Such customisation makes it possible to produce shorter series of differently decorated and tailor-made packaging materials, without creating stoppages, waste and logistics problems in the main stream of the material manufacturing line.

Finally, it is an additional object to provide a method of laminating such materials that saves energy and waste materials, in particular when changing between different outside materials and inside materials ("differentiating").

Some or all of these objects are thus attainable according to the present invention by the method of manufacturing the laminated packaging material, the packaging material obtained by the method as well as the packaging container made therefrom, as defined in the appended claims.

With the term "long-term storage" in connection with the present invention, is meant that the packaging container should be able to preserve the qualities of the packed food product, i.e. nutritional value, hygienic safety and taste, at ambient conditions for at least 1 or 2 months, such as at least 3 months, preferably longer, such as 6 months, such as 12 months, or more.

With the term "package integrity", is generally meant the package durability, i.e. the resistance to leakage or breakage of a packaging container. A main contribution to this property is that within a packaging laminate there is provided good internal adhesion between adjacent layers of the laminated packaging material. Another contribution comes from the material resistance to defects, such as pinholes, ruptures and the like within the material layers, and yet another contribution comes from the strength of the sealing joints, by which the material is sealed together at the formation of a packaging container. Regarding the laminated packaging material itself, the integrity property is thus mainly focused on the adhesion of the respective laminate layers to its adjacent layers, as well as the quality of the individual material layers.

The term "liquid or semi-liquid food" generally refers to food products having a flowing content that optionally may contain pieces of food. Dairy and milk, soy, rice, grains and seed drinks, juice, nectar, still drinks, energy drinks, sport drinks, coffee or tea drinks, coconut water, tea drinks, wine, soups, jalapenos, tomatoes, sauce (such as pasta sauce), beans and olive oil are some non-limiting example of food products contemplated.

The term "aseptic" in connection with a packaging material and packaging container refers to conditions where microorganisms are eliminated, in-activated or killed. Examples of microorganisms are bacteria and spores. Generally an aseptic process is used when a product is aseptically packed in a packaging container.

The term "heat-sealing" refers to the process of welding one surface of a thermoplastic material to another thermoplastic surface. A heat-sealable material should, under the appropriate conditions such as applying sufficient heating and pressure, be able to generate a seal when pressed against and in contact with another suitable thermoplastic material. Suitable heating can be achieved by induction heating or ultrasonic heating or other conventional contact or convection heating means, e.g. hot air.

With the term "bulk" layer is normally meant the thickest layer or the layer containing the most material in a multi-layer laminate, i.e. the layer which is contributing most to the mechanical properties and the dimensional stability of the laminate and of packaging containers folded from the laminate. In the context of the present invention, it may also mean the layer providing a greater thickness distance in a sandwich structure, which further interacts with stabilising facing layers, which have a higher Young's modulus, on each side of the bulk layer, in order to achieve sufficient such mechanical properties and dimensional stability.

A "spacer layer" is a layer that creates a distance or space between significantly thinner material layers, which have a higher Young's modulus and density, such as a high tensile stiffness paper layer, film or metal foil arranged on at least one side of the spacer layer, i.e. stiffness- and stability-providing layers, so-called facing layers. The spacer layer has a lower or reduced inherent bending stiffness and thus does not itself contribute much directly to the bending stiffness of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. When the spacer layer has very low density and is not contributing itself by any bending stiffness property, one facing layer on each side of the spacer layer is needed. When the distance between the paper facing layers is increased, also the flexural strength and bending stiffness of the laminated sandwich structure will be increased.

A "bulk layer" may comprise a "spacer layer" and a further combined or integrated layer within the bulk, but may also be the same as a "spacer layer".

According to a first aspect of the invention, there is provided a method for manufacturing of a laminated packaging material for liquid food carton packaging, comprising the steps of providing a first web comprising a layer A of paper or paperboard or other cellulose-based material, providing a second web comprising a film or sheet B, applying an aqueous composition comprising an adhesive, at an amount from 1 to 4 g/m², dry content, onto the surface of one of the first and second webs, forwarding the first and second webs, one of which having the aqueous adhesive composition applied to its surface, towards a pressure roller nip, to be joined and laminated together by the interjacent aqueous adhesive composition while passing the nip, and while the adhesive composition is partly absorbed into at least one of the first and second web surfaces of A and B.

In a preferred embodiment, there is no forced drying or curing or crosslinking of the applied adhesive composition and the lamination is taking place at ambient temperature. Even if the adhesive composition comprises quite a lot of water, in order to spread the adhesive binder polymer well and evenly across the whole surface of the substrate it is coated on, there will be no drying required, because the at least one cellulose-based layer surface to be laminated, will absorb the water to such an extent that no drying will be necessary, without the cellulose material being notably effected by the water. This was surprising in itself, since curling problems and blistering effects in subsequent heat lamination operations were expected from the absorbed moisture, but such effects have not been seen. Even more surprising, was that the level of adhesion was high enough for the required standard in liquid carton packaging materials and remained strong during storage and distribution. Despite the very low amount of adhesive applied, such as from 1 to 3 g/m$^2$, the adhesion has been above 100 N/m in all test runs so far, and would in any case be expected to be well above the minimum required around 60 N/m.

One great advantage with the method of the invention is that there is no expensive heating or forced drying equipment needed, nor any irradiation equipment or irradiation-adaptation of materials necessary.

The adhesive composition may comprise an adhesive binder polymer selected from the group consisting of polyvinyl alcohol (PVOH), polysaccharides and polysaccharide derivatives, such a starch and cellulose and their derivatives, polyvinyl acetate and acrylic-modified polyolefin adhesive polymers.

Even if other adhesive compositions might work for adhering to cellulose-based layers and other layers, the above adhesive binder polymers are preferred, since they are water soluble/dispersible and either obtainable from renewable sources or biodegradable, and safe for use in connection with packaging of food grade products.

The second web of the film or sheet B may have a surface roughness of 200 Bendtsen or lower, such as 150 Bendtsen or lower, such as 100 Bendtsen or lower, as defined by SCAN (Scandinavian Pulp and Paper Norms) P21-67 and in TAPPI UM535 (ISO 8791-2, and the aqueous adhesive composition may be applied onto the second web.

When one of the surfaces to be laminated has a smooth, less absorbing surface it is advantageous to first apply the adhesive composition on that surface, in order to provide an even and homogeneous adhesive wet applied film at the instant in the lamination operation when pressure is applied to the layers to be laminated. This ensures an optimal number of adhesion points to the more rough or porous (fibrous) cellulose-based surface, or paperboard surface.

In the case when the layer B has a low surface roughness value, the adhesive binder polymer may be an acrylic-modified polyolefin adhesive, such as an ethylene-(meth)acrylic acid copolymer dispersion in water, with a solids content from 30 to 50 weight-%.

At lower concentration of the aqueous adhesive polymer composition and/or low amounts coated onto the lamination surface(s), it may be advantageous to heat or post-heat the laminated material by one additional warm or hot roller nip, alternatively the lamination roller nip being heated. By such heating, the adhesive polymer is allowed to float among the cellulose fibres on the cellulose-based web surfaces and melt fuse together, such that upon cooling a sort of heat seal between the laminated surface is obtained, which heat seal thus extends across the interface of the adhered web surfaces.

Suitably or preferably, the amount of applied adhesive binder polymer is below 3 g/m$^2$, such as below 2 g/m$^2$, such as from 0.5 to 1.8 g/m$^2$, such as from 1 to 1.5 g/m$^2$ dry content. With the acrylic-modified adhesives, it has been seen that the very low amounts of from 0.5 to 1.8 g/m2, dry content, are in fact almost always sufficient when one of the surfaces to be laminated has the above lower surface roughness, and that in many cases it is possible to stay at from 1 to 1.5 g/m2, dry content.

The web of layer B may also be a paper or paperboard or other cellulose-based layer, whereby the adhesive binder polymer is selected from PVOH, polyvinyl acetate, starch or starch derivatives and cellulose and cellulose derivatives.

In this case, the adhesive binder polymer may be applied at an amount from 0.5 to 4 g/m$^2$, such as from 1 to 3 g/m$^2$, depending on the absorption capacity of the cellulose-based surface of the respective first and second webs, such as normally, from 2 to 3 g/m$^2$, dry content.

The most reliable adhesion results may be obtained when the thickest and bulkiest cellulose-based layer, which is normally layer A, has a moisture content from 5 to 10% RH, such as from 5.5 to 7.5% RH. This moisture level ensures quick and even absorption into the cellulose fibre network of the surface of layer A, and or layers A and B, without any negative effects on the behaviour of the, or any of the cellulose-based layers or webs.

The layer A may have a surface roughness of 300 Bendtsen or higher, such as 400 Bendtsen or higher, such as 500 Bendtsen or higher, as defined by SCAN (Scandinavian Pulp and Paper Norms) P21-67 and in TAPPI UM535 (ISO 8791-2. Such surface roughness normally entails sufficient absorption properties in the cellulose-based layer surface.

The web speed enabled by the above described method, through the lamination roller nip, may be at least 200 m/min, such as 300 m/min or higher, such as 400 m/min or higher, such as 500 m/min or higher.

Especially, the adhesion between the two laminated layers A and B is at least 60 N/m, such as at least 100 N/m.

In an embodiment of the method, the film or sheet B is laminated to the outside of layer A, i.e. to be on the outside of a packaging container made from the packaging material, and comprises a print substrate or a pre-laminated structure comprising a print substrate comprising a printed decorative pattern, and an outer transparent, protective polymer layer.

In another embodiment of the method, the film or sheet B is laminated to the inside of layer A, i.e. to be on the inside of a packaging container made from the packaging material, and comprises at least one barrier layer or barrier coating, or a pre-laminated structure comprising a barrier layer or barrier coating and an innermost heat sealable, liquid tight thermoplastic polymer.

In a particular embodiment, the film or sheet B is laminated to the outside of layer A, i.e. to be on the outside of a packaging container made from the packaging material, and comprises a metallised polymer film, which is to be the print substrate for further decorative printing patterns by any of flexography printing, off-set printing or other modern printing technologies. Thus provided are a first web comprising a layer A of paper or paperboard or other cellulose-based material and a second web B of a metallised polymer film, intended for the outside of the packaging material, such as an oriented polypropylene (OPP, BOPP) or an oriented PET film, and an aqueous composition comprising an adhesive is applied onto the metallised surface of the metallised film during forwarding thereof. The two webs are forwarded towards a pressure roller nip, while the second web has the aqueous adhesive applied to its surface, and are joined and laminated together by the interjacent aqueous adhesive composition while passing the nip, while the adhesive composition is partly absorbed into the first web A. There is no need for forced drying or heat curing of the aqueous adhesive composition, and the lamination speed can be held high, on par with normal lamination speeds of above 300 m/min, or above 400 m/min or even above 500 m/min. In particular, in this embodiment, the web of layer A may be a conventional, clay-coated paperboard of the type suitable for liquid carton packaging. The clay-coated surface, partly absorbs the aqueous adhesive composition equally well as a cellulose fibre network, without such a coating. The metallised surface of the film web B has a high smoothness such that the application of a thin film of the liquid adhesive provides an even wet coating thereof, and ensures a controlled and uniform (over the whole surface) absorption of the adhesive composition into the opposite surface to be adhered in the pressure nip, i.e. the clay-coated paperboard of the web A. The adhesive binder polymer is an ethylene acrylic acid copolymer dispersion in water, with a solids content from 40 to 50 weight-% and is applied at an amount of about 2 g/m$^2$ dry content.

The laminated paperboard and outside metallised film are then wound up onto reels and produced in large quantities for intermediate storage on reels. When it is time for the manufacturing of a laminated packaging material having a metallised film as the print substrate, the paperboard-metallised film laminate is unwound from its reel, and led to a printing station for the conventional printing of the decorative pattern on the film side, thus obtaining the metallised, shiny décor background. Subsequently, the printed material is further laminated to outermost and innermost heat-sealable, liquid-tight and protective thermoplastic polymer layers by extrusion coating or film lamination in the usual manner. The outermost heat-sealable, liquid-tight and protective thermoplastic polymer layer may alternatively be applied by means of an aqueous dispersion coating of a thermoplastic polymer, when only low thickness of such an outermost layer is desired, or when such a process is preferable for other reasons. This includes also the lamination to a barrier material layer, such as an aluminium foil, on the inside of the bulk paperboard layer, between the paperboard and the innermost thermoplastic layer, i.e. on the side of the paperboard layer which is opposite to the printed, decorative, outer side. Alternatively, the first aqueous adhesive absorption lamination step, of the paperboard to the metallised film, is connected as an in-line operation to the subsequent printing and creasing operations without any intermediate winding onto storage reels. This choice depends on the set-up of the lamination line as well as the size of incoming orders for different decorative patterns and different print substrates, and decided in view of the most economical way of working. Since the first lamination step is quick and easy to carry out and requires only one lamination station, it is easy and felxible enough to connect to in-line operations.

The adhesion obtained between the outside metallised film and the paperboard is above 100 N/m and has proven to be well as strong as needed throughout lamination manufacturing, intermediate reel storage of the laminated material, further printing and lamination steps, as well as throughout the manufacturing of fold-formed, filled and sealed liquid food packaging containers, from the laminated material. The advantages therefrom are great and simplifies the packaging laminate manufacturing process a great deal. Hitherto, the lamination of metallised film to paperboard had to take place by melt extrusion lamination with an interjacent layer of about 10-15 g/m2 of low density polyethylene (LDPE), which is of course considerably more expensive from a raw material cost point of view. Furthermore, the metallised film, which is thin and delicate to handle during lamination, is exposed to a significant heat load from the hot molten, extruded LDPE, at about 280-320° C., while the film web is moving under tension into a cooled press roller nip. Any defects due to this rough handling can be avoided by a method as described above. Any subsequent heat lamination step takes place when the film is already adhered and set to the paperboard, and is therefore not nearly as vulnerable to similar heat loads later in the manufacturing process.

According to a second aspect of the invention, a laminated packaging material manufactured by the method of the invention is provided. The resulting packaging material laminated in one or two steps by the method of the invention, will comprise a significantly lower amount of thermoplastic bonding polymer, as compared to current conventional liquid packaging materials, i.e. being laminated by melt extrusion lamination, and thereby contain a higher relative content of cellulose fibres and renewable material, which is advantageous from an environmental and climate-preserving point of view.

According to a third aspect of the invention, a packaging container manufactured from the laminated packaging material of the invention is provided. The packaging container thus has been concluded to have good package integrity, also when made by the lamination method of the invention, and may be easily adapted to customer and market requirements regarding decorative features, as well as using sensitive raw materials and pre-manufacture or pre-laminated semi-materials.

In a yet further embodiment, the method of the invention may comprise the steps of a) providing a web of a center module bulk material comprising a cellulose spacer layer, which has no or reduced inherent bending stiffness with a density below 850 kg/m$^3$, and a grammage from 60 to 250 g/m$^2$, b) providing a web of an outside material module, comprising at least a print substrate layer with or without a décor printed or applied thereon, the outside material module being intended for that side of the bulk material, which is to be directed to the outside of a packaging container made from the laminated packaging material, c) laminating the outside of the web of the bulk material and the web of the outside material module to each other, d) adding the décor to the outside material module, e) providing a web of an inside material module, comprising at least a barrier layer, the inside material module being intended for that side of the bulk material, which is to be directed to the inside of a packaging container made from the laminated packaging material, f) laminating the web of the inside material module and the inside of the web of the bulk material to each other, g) applying an outermost, transparent and liquid-tight protective layer on the outside of the outside material module, h) applying an outermost thermoplastic, liquid-tight and heat sealable layer on the inside of the inside material module, i) thus obtaining a web of the laminated cellulose-based liquid- or viscous-food packaging material, for further winding onto a reel, wherein the spacer layer constitutes the center of a sandwich structure within the laminated packaging material, the sandwich structure having the barrier layer arranged with a paper or polymer substrate facing layer on the inside of the spacer layer and interacting with a further facing layer arranged on the outside of the spacer layer, at least one of the facing layers being a paper facing layer and both facing layers having significantly lower thickness and a higher Young's modulus than the spacer layer.

The method steps may take place in any order, although the order as listed above is considered favourable from a lamination set-up point-of-view. Alternatively, the inside and outside material modules, may be pre-made, i.e. prelaminated, such that the low-density and relatively more sensitive center module with the bulk layer comprising or consisting of the spacer layer, will only need to endure two lamination operations. Since the low-density spacer layer may be more sensitive to pressure and stress, it may be advantageous to handle it as little as possible up to the finished packaging laminate. In a particular embodiment, an outside paper facing layer should first be laminated to the bulk layer, in order to be pre-cut together when making a pre-cut hole, opening or slit in the thicker, bulky parts of the material, as is today done in the conventional bulk paperboard. Such a pre-cut hole or opening or slit will thus be encapsulated between the other laminate layers that are laminated in subsequent operations, including the inside layers and the inside barrier layer, as well as the outermost polymer layer, and that form together a laminated membrane of polymer and barrier material layers.

Such a packaging laminate having a paper facing layer on the inside of the bulk layer is particularly advantageous, when the laminate has a pre-cut hole in the bulk and outside paper facing layer, in that improved openability of the laminated membrane of layers within the pre-cut hole region may be obtained. An opening device, normally has a cutting or slitting feature such that the membrane across the pre-cut hole is cut or torn open when twisting/turning the cap or screw cork of the opening device. If there is too high cutting or slitting resistance in the laminated membrane the package with opening device attached will become difficult to open, such as when very strong polymer films or layers are used as material layers in the membrane. Also, if there is low adhesion between the layers of the laminated membrane, there will be delamination and torn edges of the materials, not looking very good after opening. When using a paper facing layer as the main inside barrier substrate layer, the laminated membrane will be mechanically stable and of high laminated quality, i.e. be without any ruptures or delaminations between the layers, before or after opening.

The laminated packaging material obtained by the method of the invention may thus be a three-modular sandwich material, comprising a cellulose-based spacer layer and the mechanically stabilizing facing layer of an oriented film or high-density paper layer on the outside of the spacer layer, the laminate further comprising the a barrier paper or film having at least some oxygen barrier properties on the inside, and heat sealable layers and bonding layers or adhesive layers.

The spacer layer may thus be a layer that creates a distance or space between significantly thinner material layers, which have a higher Young's modulus and density, such as a high-density paper layer arranged on each side of the spacer layer, i.e. stiffness- and stability-providing layers, so-called facing layers. Further layers may be arranged on the sides of the spacer layer, contributing to the total sandwich construction, but a major effect has been seen with paper facing layers. The spacer layer has a lower or reduced inherent bending stiffness and thus does not contribute directly to the bending stiffness or strength of a laminated packaging material. Indirectly, it may contribute very much, however, by the interaction with adjacent or laminated layers on both sides, some of the layers having a higher Young's modulus but a lower thickness in comparison to the spacer layer. In a sandwich construction, it is important that there is at least one such facing layer, or stiffness-enhancing layer on each side of the spacer layer. When the spacer layer has very low density and is not contributing itself by any bending stiffness property, one paper facing layer on each side of the spacer layer is needed. When the distance between the paper facing layers is increased, also the mechanical strength and bending stiffness of the laminated sandwich structure will be increased.

Suitable cellulose-based materials for spacer layers may be for example so-called foamed cellulose, i.e. foam-formed fibrous cellulose, which is a fibrous material, with tunable density, that can be manufactured by a foam forming process.

A bulk layer comprising foamed cellulose thus has a density lower than 750 $kg/m^3$, such as lower than 700 $kg/m^3$, such as from 100 to 600 $kg/m^3$, such as from 100 to 500 $kg/m^3$, such as from 200 to 500 $kg/m^3$, such as from 200 to 400 $kg/m^3$, such as from 300 to 500 $kg/m^3$, such as from 300 to 400 $kg/m^3$. The lower the density of the foamed cellulose layer, the higher cost-efficiency regarding raw materials consumed, while better resistance to thickness reduction properties of a foamed cellulose was obtained at above 300 $kg/m^3$. According to an embodiment, the optimal density of foamed cellulose to be used in laminated packaging materials has been concluded to be from 300 to 500 $kg/m^3$, in particular from 300 to 400 $kg/m^3$.

A bulk layer comprising foamed cellulose as described in aspects and embodiments herein, further provides the desired strength against delamination, i.e. it does not easily delaminate under standard conditions. The delamination strength can be determined by for example the Huygen Internal Bonding Energy testing device which follows TAPPI T569 and provides a value of $J/m^2$ where the packaging material herein is between 60-300 $J/m^2$, such as 60-250 $J/m^2$, such as 80-200 $J/m^2$, such as 140-200 $J/m^2$. In some aspects and embodiments the bulk layer is providing a distance between a barrier layer and an outermost thermoplastic decor layer, and is thereby enabling tailor-made laminated packaging material structures. In some embodiments the bulk layer comprising foamed cellulose provides delamination strength in combination with compression strength in the thickness (ZD) direction, and provides sufficient distance between the barrier layer and the decor layer.

Foamed cellulose can be generated by mixing cellulose fibers and a foaming fluid, such as water and optionally a surfactant such as sodium dodecyl sulphate (SDS). The amount of the surfactant should be 0.1 w % to 20 w %, such as 0.5 w % to 10 w %, such as 1 w % to 5 w % such as 1.5 w %-3 w %. A rotor mixer on a general foam-generator generates the foamed cellulose. The foam is generally formed by bringing a gas into the mixture. Air is an example of an appropriate gas. Another suitable gas is oxygen. Generally the gas is brought into the mixture by pressurized gas and by the vortex caused by stirring. Generally the cellulose is provided as a liquid dispersion comprising cellulose fibers. An example of liquid is water. Some examples of cellulose fibers are cellulose based fibers such as chemical pulp fibers, chemi-thermomechanical pulp fibers, thermo-mechanical pulp fibers, and Kraft pulp fibers. The fibre dispersion may for example be added to the foaming fluid after a foam has been generated by the fluid (including the surfactant). Optionally, the liquid dispersion comprising cellulose fibers may be combined with the foaming fluid prior to foaming. An additive, for controlling the consistency of the foam may be added, if necessary. The foamed cellulose generated as described herein is run through a nozzle arrangement ("headbox") where pressure and forming tools generate a web of foamed cellulose which is rolled onto a reel, after at least partly drying, and stored before future use to prepare for example a packaging material. Optionally the foamed cellulose web can be used in-line, i.e. directly applying additional layers in order to transform the foamed cellulose web to a laminated packaging material for liquid or semi-liquid food packaging. Compared to traditional paper manufacturing, additional or modified drying may suitably be used in order to achieve the desired dryness and density.

In some embodiments the foamed cellulose may be mixed with other materials, for example additives, and/or microfibrillar cellulose, and/or refined pulp, and/or strength chemicals or agents, such as starch and derivatives thereof, mannogalactans, carboxymethyl cellulose, melamine-formaldehyde colloids, urea-formaldehyde resins, polyamide-polyamine-epichlorhydrin resins.

Another example of a spacer layer is made from so-called container board material, which normally has a quite high density but a lower inherent bending stiffness, as well as other differences in mechanical properties, i.e. still inadequate mechanical properties in comparison to conventional liquid packaging paperboard, such that the dimensional and mechanical stability, and thus the integrity and barrier properties, of packages made from a laminate having a bulk layer of such a material would be deteriorated when made by conventional manufacturing of a packaging laminate.

In particular, it has a substantially lower bending stiffness itself compared to a laminated packaging material suitable for liquid packaging. Bending stiffness is not commonly measured on containerboard materials, since they were anyway intended for corrugated carton manufacturing, but it has been measured that such materials have a bending stiffness at least 30%, such at least 40% such at least 50% lower, than the bending stiffness of a liquid carton paperboard, e.g. of the Triplex or Duplex type, at a corresponding grammage when excluding the printable coating (clay-coat) grammage. Generally, fluting materials have a higher bending stiffness per grammage than linerboard materials.

It still contributes to the total bending stiffness of a laminated packaging material, however, by providing a distance layer in a sandwich construction between facing layers, which have a higher Young's modulus, and by having higher compression strength properties in the in-plane (x-y) of the layer, than conventional paperboard for liquid packaging.

Containerboard is also known as corrugated case material (CCM), and the materials needed for a corrugated case material are a corrugated medium (or fluted medium) which is, in use, fluted (welled) and then arranged by glueing between two flat linerboards or liner mediums. Such a corrugated construction provides a high sandwich structure bending stiffness, due to the fluted intermediate layer, which is acting as a distance or spacer layer between the two, relatively thinner, liner layers. The two types of paper that make up containerboard are thus linerboard material, also commonly called Kraft liner or Test liner, and fluting (or corrugating medium) material.

The two types of paper that make up containerboard are linerboard material and fluting (or corrugating medium) material. Since containerboard is made mainly out of natural unbleached cellulose fibres, it is generally brown, or beige although its shade may vary depending on the type of cellulose. There are, lower than 835 kg/m3, is brown or beige and comprises mainly softwood fibres, such as spruce and pine fibres.

Fluting is thus a paper product normally used as corrugating medium in corrugated container-paperboards, having a density of from 600 to 750 kg/m$^3$, such as from 600 to 700 kg/m$^3$, normally around 650 kg/m$^3$. Fluting paper is brown or beige and contains mostly short fibres, and is, just like linerboard, generally a low-cost, low-quality paper, which is not in itself suitable for manufacturing of liquid carton packages. However, when used as a spacer layer in a sandwich structure, it may work well for the purpose, and at a substantially lower price, if of an approved kind and combined in the right way with the right layers in such a packaging laminate.

The fluting material would, however, form a spacer layer, which is non-fluted, by being a lower-stiffness, lower-cost fibrous material that may provide sufficient distance in a sandwich construction for a laminated liquid carton packaging material. Fluted spacer layers, i.e. well-formed spacer layers, are not within the scope of the present invention. Corrugated carton materials would pose quite different technical implications and requirements to liquid carton laminated packaging materials, and will not be dealt with here.

The fibres generally used in the manufacture of containerboard materials can be broadly classified into two main types, recycled fibres and new, i.e. virgin, fibres. The properties of paper are dependent on the structural characteristics of the various fibres that compose the sheet. Generally speaking, the higher the content of virgin fibres, the stronger and stiffer (higher compression resistance) the fluting or linerboard material will be. The fluting material that has been explored for the purpose of this invention is a semi-chemical fluting made of 100% virgin fibres made of hardwood, such as birch, from Powerflute. Birch is an optimal fluting raw material. Its structure contains high concentrations of lignin and hemicellulose. The pulping process preserves the naturally highly hydrophobic lignin and modifies the remaining hemicellulose so that the soft and flexible cellulose core of the fibre is protected. This provides a higher stiffness and creep properties. When used for liquid packaging, the available fluting materials on the market need to be complemented with one or more additional sizing agent during cellulose web manufacturing, in order to cope with the liquid and high-moisture conditions for this new use and application. Conventional sizing technologies and chemicals (AKD, ASA, rosin, etc.) can be used for the fluting material in order to meet the necessary requirements for the specific product.

Linerboard made of virgin fibres, is called kraft liner, whereas linerboard from recycled fibres is known as testliner. Also mixes of virgin and recycled fibres are possible. Kraft linerboard should have at least 80 wt %, and preferably 100 wt % of virgin fibres. The fibres used for linerboard are longer than those used in fluting material, and since linerboard is originally intended for the outer, liner layers of a carton material, they are also sized with sizing agents in order to withstand different degrees of moisture and wet conditions.

Containerboard materials thus have lower bending stiffness than corresponding paperboards for liquid packaging, but have, on the other hand, a higher SCT index, i.e. a higher SCT value per grammage unit in the machine direction (MD), than a normal liquid paperboard material, or other paper or cellulose material that would be suitable in this context. The SCT value is a property measured by the international standard ISO9895, and which is relied on to compare different containerboard materials with each other. The SCT or Short Compression Test measures the internal compression resistance of paper fibres, i.e. the in-plane compression strength of a paper, in CD and MD. This property varies with the grammage of the specific paper measured on. Grammage of paper products is measured according to ISO 536.

Packages made from a material having a higher SCT index, have better stackability, and it is thus a measurement of compression strength per grammage in the in-plane (x-y plane) of a carton material. Containerboard materials normally have an SCT index of more than 30 Nm/g in MD, and would thus provide i.a. the required compression strength and stackability properties for a liquid paperboard laminate. These materials do not need to be optimised regarding bending stiffness properties, since they will only be used as (non-fluted) spacer layers in laminated materials for liquid carton packaging. Thus, whereas such linerboard materials originally are intended for facing layers in a corrugated carton sandwich structure, they will for the purpose of the present invention be used as the spacer layer in a laminated structure, having further facing layers laminated on each side thereof, in order to provide the required bending stiffness properties for liquid carton laminated materials.

For comparison, today's liquid paperboard materials have an SCT index of about 25 Nm/g, but are then also optimised regarding all other properties, since they are relied on as the main provider of dimensional stability in liquid carton laminated packaging materials. When replacing today's optimised liquid paperboard with a low-cost spacer layer in a sandwich structure in a laminate, such a spacer layer needs to have a higher SCT index, of above 30 Nm/g, in order to compensate for the loss of properties when removing the state-of-the-art paperboard.

Since the new spacer layer will be laminated to further facing layers in a sandwich configuration in a laminate structure, there is no need to provide a white or smooth (e.g. clay-coated) printing surface on the spacer layer itself. Also in that respect, the container board materials are thus suitable materials for such a spacer layer.

Regarding moisture resistance, conatinerboard materials may have a Cobb water adsorption value of lower than 35 g/m2, in order to function better in a liquid carton packaging laminate. The Cobb value is measured according to ISO 535, and is fulfilled by most linerboard materials already, while some fluting materials may need additional sizing in order to be used as a non-fluted spacer layer in a liquid carton packaging laminate. Accordingly, a containerboard material in a bulk layer, comprises at least one sizing additive.

In a further embodiment, the spacer layer may comprise a combination of different cellulose or paper types. If the spacer layer comprises foamed cellulose, the foamed cellulose part is at least 20%, such as at least 25% such as at least 30%, such as at least 40% of the thickness of the bulk layer. The percentages may be determined by examining the cross-section of the packaging material in a microscope.

When downgauging from conventional liquid paperboard to such alternative cellulose materials for the bulk layer, it has been seen that the aluminium foil barrier laminated to the inside of the bulk layer, may get fine cracks and is not tight towards gas permeation any longer. When saving costs on the paperboard material, it has thus been seen as necessary to spend more on the barrier material, in order to compensate for the loss of oxygen barrier. Another thought, has of course been to replace the aluminium foil with a different, better barrier somehow, but this has up to now been seen as an expensive wish and/or an expensive juxtaposition of several different barrier layers that are rather thick and laminated to each other in order to provide the required barrier properties.

In another embodiment, the bulk layer mainly comprises a spacer material layer, but in addition may comprise one or two integrated paper layer(s) having a relatively higher Young's modulus but lower thickness than the spacer layer, in order to provide some mechanical strength and bending stiffness to the finally produced laminated material.

According to an embodiment, the final laminated material comprises at least one such relatively thinner and stiffer paper arranged on each side of the spacer layer. With such an arrangement, the thinner papers having a higher Young's modulus act similarly to flanges of an I-beam construction or to facing layers of a sandwich construction, thus stabilizing the sandwich mechanically, e.g. regarding bending stiffness, and compression strength in various directions within the material.

Suitable such stabilizing paper facing layers may be found among thin Kraft papers, greaseproof papers or parchment papers. They should have a grammage from 20 to 100 g/m$^2$, such as from 30 to 70 g/m$^2$, such as from 30 to 60 g/m$^2$ and a density from 600 to 1500 kg/m$^3$.

Typically, the paper facing layers should have a Young's modulus from 1 to 10 GPa, such as from 5 to 10 GPa.

Paper facing layers may be included in the laminated material structure in different ways. For example, when the spacer layer has higher density and inherent stiffness by itself, such as a fluting material spacer layer, the bulk material layer may comprise a fluting material layer and such a thinner, and more high-density paper facing layer on one side of the spacer layer. It may then be sufficient for the final laminated material to just have the compact-surface barrier paper on the inside, and to have a less stabilizing facing layer of a different material such as an oriented plastics film, on the outside of the spacer layer. Alternatively, a paper facing layer may be included also in the outside material module to be laminated to the fluting material layer.

The bending stiffness of a packaging material laminate may be derived from the thicknesses and the Young's moduli of the individual layers. For balancing mechanical properties of a sandwich laminated material structure, the facing layers of the sandwich should be arranged on each, respective, side of the spacer layer, such that they have substantially equal extensional stiffness. The extensional stiffness is given by the product of Young's modulus and thickness. This may be regulated by varying the thickness and the Young's modulus of the papers, and where there are more than one such paper facing layers on the one side of the spacer layer, there is a formula for calculating the total bending stiffness of that particular combination of facing layers.

In an embodiment where the bulk layer comprises foamed cellulose, the final laminated material comprises one paper facing layer arranged on each side of the spacer layer, in order to provide sufficient stability to the final laminated packaging material.

In an embodiment, the bulk material thus comprises a spacer layer and the barrier-coated paper as facing layer on the first side (the inside) of the spacer layer, while the outside material module also comprises a paper facing layer, being a print substrate, to be laminated to the second side (the outside) of the bulk and spacer layer. In another embodiment, the bulk material layer comprises a spacer layer and an integrated, paper facing layer on the second side of the spacer layer, while the inside material module comprises the barrier paper facing layer, thus laminated to the first side of the bulk and spacer layer.

In a further embodiment, the bulk material comprises a spacer layer and one integrated, paper facing layer on each side of the spacer layer.

In a particular embodiment, the spacer layer is a fibrous layer made by a foam-forming process and has a grammage of 150 g/m² and a thickness of 600 μm and has a high-density paper of a grammage of from 60 to 80, such as 70, g/m² arranged on each side thereof.

A suitable print substrate may be a stabilizing stretched and pre-manufactured polymer film, which may be a polymer film selected from the group consisting of films based on any of polyesters, such as oriented or non-oriented polyethylene terephthalate (PET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

The print substrate may have a printable surface which is a clay-coated white paper surface, or a brown, natural paper surface or a metallised film or a metallised paper surface.

The outside material module may thus be laminated to the bulk material layer by applying an aqueous adhesive composition at an amount from 1 to 4 g/m², such as from 1 to 3 g/m², to one of the surfaces to be adhered to each other, and subsequently pressing them together.

The inside material module may be laminated to the bulk material by applying an aqueous adhesive composition at an amount from 1 to 4 g/m², such as from 1 to 3 g/m², to one of the surfaces to be adhered to each other, and subsequently pressing them together.

In laminating the two webs of the in- and outside material modules to the web of the bulk layer, one of the lamination steps may be performed by means of melt extrusion lamination with an interjacent molten thermoplastic bonding polymer, which is a common way of laminating two webs to each other. In an embodiment of the invention, where the surfaces to be laminated to each other are all paper or cellulose-based surfaces, there will be good resulting adhesion between the laminated surfaces. Some types of surfaces may require an oxidizing pre-treatment of the surface before adhering to the other surface, or alternatively, or in addition, the bonding polymer to be melt extruded may at least partly comprise an adhesive thermoplastic polymer, i.e. a polymer having functional groups with affinity to various surface, normally carboxylic or maleic anhydride groups.

Suitable adhesive polymers for the melt extrusion bonding layers interior of the laminated material, i.e. between an outer heat sealable layer and the barrier- or primer-coated substrate layer, or for bonding the barrier film to the bulk layer in a mono- or multilayer such bonding laminate layer, are the so-called adhesive thermoplastic polymers, such as modified polyolefins, which are mostly based on LDPE or LLDPE co-polymers or, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

Corresponding modified polypropylene-based thermoplastic adhesives or bonding layers may also be useful, depending on the requirements of the finished packaging containers.

Such adhesive polymer layers or tie layers are normally applied together with the respective outer layer or further bulk-to-barrier bonding layers in a co-extrusion coating operation.

The aqueous adhesive composition may thus be applied onto one of the surfaces to be laminated to each other, and then joined with the other surface in a lamination station, involving one or more lamination pressure roller nips.

Preferably, and generally, in order to apply as little pressure to the weaker, low-density spacer layer as possible, there should be only one lamination nip in a lamination station. It is possible, however, that several, consecutive nips may be advantageous in some embodiments, by applying a lower nip pressure but by several consecutive roller nips, or by one extended nip arrangement, in order to enhance adhesion.

The laminated packaging materials of the invention may have a higher content of fibres and materials from renewable resources, which is advantageous from an environmental point-of-view. Furthermore, by an increased proportion of cellulose fibres in the material, it may become easier to handle in recycling processes, in particular when also the proportional amount of thermoplastic polymer layers and aluminium foil simultaneously may be decreased. This is for example one advantageous effect, when lamination of cellulose-based modules may be done by aqueous adhesive absorption lamination, i.e. a lamination method wherein only a very small amount of polymer adhesive is applied and binding the two surfaces to be laminated together, while the aqueous medium or solvent is absorbed into the cellulose fiber network of the laminated layer(s) and no further drying or heating is needed. Thus, while less thermoplastic bonding material is needed, such as in melt extrusion lamination, the relative proportion of paper or cellulose-based material layers in the packaging material is increased and furthermore, the barrier layers may be down-gauged, due to efficient combinations of properties of the various material layers included in the laminated packaging material.

Suitable thermoplastic polymers for the outermost and innermost heat sealable liquid-tight layers in the laminated packaging material of the invention, are polyolefins such as polyethylene and polypropylene homo- or co-polymers, preferably polyethylenes and more preferably polyethylenes selected from the group consisting of low density polyethylene (LDPE), linear LDPE (LLDPE), single-site catalyst metallocene polyethylenes (m-LLDPE) and blends or copolymers thereof. According to a preferred embodiment, the outermost heat sealable and liquid-tight layer is an LDPE, while the innermost heat sealable, liquid-tight layer is a blend composition of m-LLDPE and LDPE for optimal lamination and heat sealing properties. The outer- and innermost thermoplastic polymers layers may be applied by (co-)extrusion coating of the molten polymer to a desired thickness. According to another embodiment, the outer- and/or innermost liquid-tight and heat sealable layers may be applied in the form of pre-manufactured, oriented or non-oriented films.

The same thermoplastic polyolefin-based materials, in particular polyethylenes, as listed above regarding the outermost and innermost layers, are also suitable in bonding layers interior of the laminated material, i.e. between a bulk or core layer, such as paper or paperboard, and a pre-laminated material, including a barrier film or another film layer.

Possible further barrier layers may involve a film or thin paper substrate having a barrier coating, such as a dispersion coated or liquid film coated barrier coating, or a vapour deposited barrier coating.

A suitable film substrate for such barrier films may be a polymer film selected from the group consisting of films based on any of polyesters, such as oriented or non-oriented polyethylene terephthalate (PET), oriented or non-oriented polyethylenefuranoate (PEF), oriented or non-oriented polybutylene terephthalate (PBT), polyethylene napthanate (PEN), polyamides, such as, non-oriented or oriented polyamide (PA, OPA, BOPA), ethylene vinyl alcohol copolymers (EVOH), polyolefins such as polypropylene, mono- or biaxially oriented polypropylene (PP, OPP, BOPP), polyethylenes such as oriented or non-oriented high density polyethylene (HDPE), linear low density polyethylene (LLDPE) and cyclo-olefin co-polymers (COC), and blends of any of said polymers, or a multilayer film having a surface layer comprising any of said polymers or blends thereof.

According to some embodiments, the barrier properties may be provided by a polymer layer or multilayer, or a film from one or more barrier polymers, while in other embodiments the polymer of a film is only for the purpose of providing a substrate for a subsequently applied barrier coating.

Oxygen barrier properties may be provided by thin liquid film coatings, for example barrier polymers that are coated in the form of a dispersion or solution in a liquid medium or solvent, onto a substrate, such as a paper or polymer film substrate, and subsequently dried into thin barrier coatings. It is important that the dispersion or solution is homogeneous and stable, to result in an even coating with uniform barrier properties. Examples of suitable polymers for aqueous compositions are polyvinyl alcohols (PVOH), water-dispersible ethylene vinyl alcohols (EVOH) or polysaccharide-based water-dispersible or dissolvable polymers. Such dispersion coated or so called liquid film coated (LFC) layers may be made very thin, down to tenths of a gram per m², and may provide high quality, homogenous layers, provided that the dispersion or solution is homogeneous and stable, i.e. well prepared and mixed. PVOH has excellent oxygen barrier properties under dry conditions and also provides very good odour barrier properties, i.e. capability to prevent odour substances from entering the packaging container from the surrounding environment, e.g. in a fridge or a storage room, which capability becomes important at long-term storage of packages. Furthermore, such liquid film coated polymer layers from water-dispersible or -dissolvable polymers often provide good internal adhesion to adjacent layers, which contributes to good integrity of the final packaging container.

Suitably, such a barrier polymer is thus selected from the group consisting of vinyl alcohol-based polymers, such as PVOH or water dispersible EVOH, polysaccharides such as for example starch or starch derivatives, cellulose nanofibrils (CNF), nanocrystalline cellulose (NCC), hemicellulose, chitosan or other cellulose derivatives, water dispersible polyvinylidenechloride (PVDC) or water dispersible polyesters, or combinations of two or more thereof.

More preferably, the polymer binder is selected from the group consisting of PVOH, water dispersible EVOH, polysaccharides such as for example starch or starch derivatives, chitosan or other cellulose derivatives, or combinations of two or more thereof.

Such barrier polymers are thus suitably applied by means of a liquid film coating process, i.e. in the form of an aqueous or solvent-based dispersion or solution which, on application, is spread out to a thin, uniform layer on the substrate and thereafter dried before laminating or coating o further layers.

Aqueous compositions generally have certain environmental advantages. Preferably, the liquid gas barrier composition is water-based, because such composition usually have a better work-environment friendliness than solvent-based systems, as well.

Most preferably, the gas barrier polymer is PVOH, because it has all the good properties mentioned above, i.e. film formation properties, gas barrier properties, cost efficiency, food compatibility and odour barrier properties.

A PVOH-based gas barrier composition performs best when the PVOH has a degree of saponification of at least 98%, preferably at least 99%, although PVOH with lower degrees of saponification will also provide oxygen barrier properties.

According to a further embodiment, the liquid composition additionally comprises inorganic particles in order to further improve the oxygen gas barrier properties.

The polymer binder material may for example be mixed with an inorganic compound which is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

The inorganic laminar compound is a so-called nanoparticle compound dispersed to an exfoliated state, i.e. the lamellae of the layered inorganic compound are separated from each other by means of a liquid medium. Thus the layered compound preferably may be swollen or cleaved by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer. There are many chemically suitable nano-clay minerals, but preferred nano-particles are those of montmorillonite, such as purified montmorillonite or sodium-exchanged montmorillonite (Na-MMT). The nano-sized inorganic laminar compound or clay mineral preferably has an aspect ratio of 50-5000 and a particle size of up to about 5 μm in the exfoliated state.

Suitable inorganic particles mainly consist of laminar bentonite particles having an aspect ratio of from 50 to 5000.

Preferably, the barrier layer includes from about 1 to about 40 weight %, more preferably from about 1 to about 30 weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating. The total dry content of the composition is preferably from 5 to 15 weight-%, more preferably from 7 to 12 weight-%.

According to a different preferred embodiment, the inorganic particles mainly consist of laminar talcum particles having an aspect ratio of from 10 to 500. Preferably, the composition comprises an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. The polymer binder seems to be in too low an amount to surround and disperse the particles and laminate them to each other within the layer. The total dry content of such a liquid barrier composition from PVOH and talcum particles may be between 5 and 25 weight-%.

The preferred polymer binder, also when employing inorganic particles for providing oxygen barrier properties, is PVOH, partly due to its advantageous properties mentioned above. In addition, PVOH is advantageous from a mixing point of view, i.e. it is generally easy to disperse or exfoliate inorganic particles in an aqueous solution of PVOH to form a stable mixture of PVOH and particles, thus enabling a good coated film with a homogeneous composition and morphology.

Preferably, according to the invention, the said oxygen gas barrier layer is applied at a total amount of from 0.1 to 5 $g/m^2$, preferably from 0.5 to 3.5 $g/m^2$, more preferably from 0.5 to 2 $g/m^2$, dry weight. Below 0.1 $g/m^2$, there will be no gas barrier properties achieved at all, while above 5 $g/m^2$, the coated layer will not bring cost-efficiency to the packaging laminate, due to high cost of barrier polymers in general and due to high energy cost for evaporating off the liquid. A recognisable level of oxygen barrier is achieved by PVOH at 0.5 $g/m^2$ and above, and a good balance between barrier properties and costs is achieved between 0.5 and 3.5 $g/m^2$.

According to a preferred embodiment of the invention, the oxygen gas barrier layer is applied in two consecutive steps with intermediate drying, as two part-layers. When applied as two part-layers, each layer is suitably applied in amounts from 0.1 to 2.5 $g/m^2$, preferably from 0.5 to 1 $g/m^2$, and allows a higher quality total layer from a lower amount of liquid gas barrier composition. More preferably, the two part-layers are applied at an amount of from 0.5 to 2 $g/m^2$ each, preferably from 0.5 to 1 $g/m^2$ each.

According to a different embodiment of the invention, barrier coatings may be applied by means of physical vapour deposition (PVD) or chemical vapour deposition (CVD) onto a substrate surface of a film material. The substrate material itself may contribute with some properties as well, but should above all have appropriate surface properties, suitable for receiving a vapour deposition coating, and should work efficiently in a vapour deposition process.

Thin vapour deposited layers are normally merely nanometer-thick, i.e. have a thickness in the order of magnitude of nanometers, for example of from 1 to 500 nm (50 to 5000 Å), preferably from 1 to 200 nm, more preferably from 1 to 100 nm and most preferably from 1 to 50 nm.

One common type of vapour deposition coating, often having some barrier properties, in particular water vapour barrier properties, is so called metallisation layers, e.g. aluminium metal physical vapour deposition (PVD) coatings.

Such a vapour deposited layer, substantially consisting of aluminium metal may have a thickness of from 5 to 50 nm, which corresponds to less than 1% of the aluminium metal material present in an aluminium foil of conventional thickness for packaging, i.e. 6.3 μm. While vapour deposition metal coatings require significantly less metal material, they only provide a low level of oxygen barrier properties, at most, and need to be combined with a further gas barrier material in order to provide a final laminated material with sufficient barrier properties. On the other hand, it may complement a further gas barrier layer, which does not have water vapour barrier properties, but which is rather sensitive to moisture.

Other examples of vapour deposition coatings are aluminium oxide (AlOx) and silicon oxide (SiOx) coatings. Generally, such PVD-coatings are more brittle and less suitable for incorporation into packaging materials by lamination. Metallised layers as an exception do have suitable mechanical properties for lamination material despite being made by PVD, however generally providing a lower barrier to oxygen gas.

Other coatings which have been studied for laminated packaging materials may be applied by means of a plasma enhanced chemical vapour deposition method (PECVD), wherein a vapour of a compound is deposited onto the substrate under more or less oxidising circumstances. Silicon oxide coatings (SiOx) may, for example, also be applied by a PECVD process, and may then obtain very good barrier properties under certain coating conditions and gas recipes. Unfortunately, SiOx coatings show bad adhesion properties when laminated by melt extrusion lamination to polyolefins and other adjacent polymer layers, and the laminated material is exposed to wet or highly humid packaging conditions. Special, expensive adhesives or adhesive polymers are needed to reach and maintain sufficient adhesion in a packaging laminate of the type intended for liquid carton packaging.

According to this invention, the vapour deposition coating is an amorphous hydrogenated carbon barrier layer applied by a plasma enhanced chemical vapour deposition process, PECVD, a so-called diamond-like carbon (DLC). DLC defines a class of amorphous carbon material that displays some of the typical properties of diamond. Preferably, a hydrocarbon gas, such as e.g. acetylene or methane, is used as process gas in the plasma for producing the coating. As pointed out above, it has now been seen that such DLC coatings, provide good and sufficient adhesion to adjacent polymer or adhesive layers in a laminated packaging material under wet testing conditions. Particularly good adhesion compatibility with adjacent laminated polymer layers, i.e. polymer layers which are adherent to or coated onto the DLC barrier coating, has been seen with polyolefins and in particular polyethylene and polyethylene-based co-polymers.

The DLC barrier coating thus provides good barrier and integrity properties to liquid-filled packaging containers made from a packaging laminate comprising a barrier film having the barrier coating, by contributing with good mechanical properties, good barrier properties to various substances migrating through such laminated materials in either inward or outward direction from a filled package, as well as by resulting in excellent adhesion to adjacent polymer layers in a laminate. Accordingly, a barrier film from a substrate layer of a polyester or polyamide, having a DLC barrier coating can provide a packaging laminate and a packaging container with oxygen barrier properties as well as water vapour barrier properties, for long term ambient storage, such as for up to 2-6 months, such as for up to 12 months. In addition, the DLC barrier coating provides good barrier properties to various aroma and flavour substances present in the packed food product, to low-molecular substances possibly appearing in the adjacent layers of materials, and to odours and other gases than oxygen. Moreover, the DLC barrier coating, exhibits good mechanical properties, as coated on a polymer film substrate, when laminated into a carton-based packaging laminate, withstanding lamination and subsequent fold-forming of the packaging laminate and sealing it into filled packages.

DLC coatings further have the advantage of being easy recyclable, without leaving residues in the recycled content that contain elements or materials that are not naturally existing in nature and our surrounding environment.

The use of the above described adhesive polymers should not be necessary for sufficient bonding to in particular metallised layers or DLC barrier coatings of the invention. Metallisation adhesion to polyethylene layers are good, and sufficient and adequate adhesion to polyolefin layers as adjacent layers have been concluded also regarding DLC, at a level of at least 200 N/m, such as at least 300 N/m. Adhesion measurements were performed at room temperature with a 180° degrees peel force test apparatus (Telemetric Instrument AB), 24 h after the LDPE lamination. Peeling was performed at the DLC/LDPE interface, the peel-arm being the barrier film. When needed, distilled water droplets were added to the peeled interface during peeling to assess the adhesion under wet conditions, i.e. the conditions when the laminated packaging material has been saturated with migrating moisture through the material layers, from the liquid stored in a packaging container made from the laminated material, and/or by storage in a wet or highly humid environment. The given adhesion value is given in N/m and is an average of 6 measurements.

A dry adhesion of more than 200 N/m thus ensures that the layers do not delaminate under normal package manufacturing conditions, e.g. when bending and fold-forming the laminated material. A wet adhesion of this same level ensures that the layers of the packaging laminate do not delaminate after filling and package formation, during transport, distribution and storage. The interior bonding polymer layer may be coated directly onto the polymer film substrate having a DLC barrier layer coated thereon, by using common techniques and machines, e.g. those used for the lamination of an aluminum foil, in particular hot lamination (extrusion) of the polymer layer from a molten polymer onto the DLC barrier coating. Also, using a pre-made polymer film and binding it directly to the barrier-coated carrier film by locally melting it, e.g. by applying heat with a hot cylinder or heated roller, is possible. From the above it is apparent that the DLC barrier film can be handled in a similar way to an aluminium foil barrier in the lamination and conversion methods into a laminated packaging material, i.e. by means of extrusion lamination and extrusion coating. The lamination equipment and methods do not require any modification, by for example adding specific adhesive polymers or binder/tie layers as may be required by other plasma coated materials. In addition, the new barrier film including the DLC barrier layer coated thereon can be made as thin as an aluminium foil without adversely affecting the barrier properties in the final food package.

When manufacturing a laminated packaging material of the invention, it has been seen that in asymmetric laminates having layer structures with unequal extensional stiffness properties on the two sides of the spacer layer, a problem called moisture-induced curling appears, i.e. the flat material does not stay flat when lying on a flat surface, but rolls up such that the edges are raised and bent towards each other above the plane of the flat part of the packaging material. A further advantage with planar laminated side panels in a packaging container, is that the grip stiffness will be improved. This is due to the straight panels being free from initial "imperfection", such as bending. Naturally, there will be fewer problems when running a flat packaging material through the filling machines, than a curled and crooked one.

It has been seen that curling is mainly prevented by matching the paper facing layers on each side of the spacer layer, to have equal total extensional stiffness. By doing so, it has surprisingly been seen that also the compression strength of the laminate in x-y direction will be increased, due to flatness of the laminated material panels. This means for example that folded packaging containers from the laminated packaging material may be stacked on top of each other during distribution and storage at a higher load than today's marketed liquid food packages.

From this follows, that packages made from such symmetrically dimensioned laminated packaging materials, having a paper facing layer on each side of the spacer layer in a sandwich, may get an improved package integrity, i.e. the package integrity is improved, and the laminated materials are less prone to be damaged and getting cracks in the barrier layers by mere handling and transport.

If the mechanical properties of the sandwich material are balanced in this way, the various laminated layers, including the barrier layers, which are protecting the packed food against slowly migrating oxygen and other gases and vapours, will also be more resistant to damages and delamination, and as a consequence the integrity of the filled and sealed package is improved also from this point of view.

Thus, a further aspect of improving package integrity, is to improve the adhesion between the various layers. Particularly good initial adhesion is obtained between dispersion- or solution-coated barrier coatings having hydrophilic functionality such as hydroxyl groups and carboxylic groups and adjacent layers such as for example polyolefins and polyethylenes. Also vapour deposited metallised coatings and DLC PECVD coatings have proved to provide very good adhesion properties to adjacent organic polymer layers and films, such that no extra primer or adhesive must be used between these and their adjacent layers in the laminated packaging materials.

Nevertheless, it has been shown that, at least regarding metallised barrier coating layers, further enhanced adhesion by laminating to adjacent layers of tie polymers or adhesive polymers, surprisingly also improves the oxygen barrier properties of the laminated material even further and to a higher degree.

Additional oxygen barrier properties may be provided by further including a layer of a polymer acting as barrier to migrating free fatty acids, such as polyamide in the first pre-laminated material to be laminated to the bulk layer. In particular, when a polyamide is added on the inner side of a metal barrier layer, this prevents free fatty acids from the packed food product to migrate from the food to the metal barrier layer, and thus the barrier properties of the barrier layer may be kept intact and the adhesion of the inside polymer layers (heat seal) to the metal barrier may be maintained for a longer shelf-life time.

The paper facing layer on the outside of the bulk layer may in an embodiment be a same or different compact-surface barrier paper, coated or uncoated, as is laminated on the inside of the bulk layer. Of course, such a paper facing layer would then contribute further to the oxygen barrier of the final packaging laminate.

According to yet a further embodiment, a package that is based on biological, renewable materials as far as possible, may be obtained. For example a packaging material can be produced, which has cellulose-based spacer and bulk layers, paper facing layers having barrier properties and further comprising very thin, nano-thin, barrier coatings. Moreover, the thermoplastic polymers can be produced from vegetable or organic material, such as so-called green polyethylene.

In addition, the adhesives or adhesive polymers used in the lamination operation into the final laminated packaging material may be entirely bio-sourced and used only in very low amounts, which increases the relative proportion of renewable, and also cellulose fibre, content even further.

The outermost heat sealable layers of the laminated material may alternatively be provided as one or two pre-manufactured films. Thus, such a film may be pre-laminated to the barrier layer, in a first pre-laminate material to be laminated to the first side of the bulk layer, and/or pre-laminated to a printed and decorated outside surface layer to be laminated to the second side of the bulk layer. When films are pre-laminated to barrier layers or printed, decorated layers, it may be by mere heat-pressure lamination of the films to the other layers, especially if a pre-coated or integrated layer of an adhesive polymer such as EAA or EMAA is present on one of the lamination surfaces. Alternatively, it may be by means of melt extrusion lamination, which is more expensive due to the higher consumption of interjacent melt extrusion polymer, or by pre-coating with a small amount of an aqueous adhesive that may penetrate into the at least on paper or cellulose-based surface to be laminated, without any drying step needed.

Within the general quest of lowering costs of laminated packaging materials, it is highly desired to combine properties in the various layers such that as few as possible additional layers are needed.

When the conventional liquid packaging paperboard of today's packaging laminate is replaced by weaker bulk layers, enabling significant cost savings, some additional costs may instead be spent on various tailor-made décor facing substrates for printing and decorating the laminated packaging material. Since the bulk layer of the invention will no longer constitute a print-surface, i.e. a surface to be printed, the expensive clay-coat may be omitted from the bulk layer, and a smooth and white print surface may be obtained by other means, on the outside print substrate facing paper, to be laminated to the outer side of the bulk layer. Such a print substrate may for example be a coloured film or a white printable paper facing layer. Alternatively, a white paper for providing the white print background surface may be pre-laminated to a transparent film, which is printed before laminating on its back-side, i.e. a reverse printed film, such that the printed décor is directed towards the white paper surface and protected by the transparent film substrate. Thus, the printing and the lamination to an outside white, paper facing layer and possibly the further lamination to outermost heat sealable layers may take place in a prior lamination operation in order to provide the second pre-laminated material for the second side, the outside, of the laminated packaging material.

In order to further provide light barrier properties and whiteness, such a film or paper may comprise white filler material or in the case of paper a clay-coat, also or instead, a metallised layer. For some products and appearances of the packaging containers, a metallised print surface is preferred, and in other cases a coloured print surface or a brown, natural cellulose print surface. By detaching the print surface layer from the bulk layer, versatility in possible outside appearances becomes possible and this is a further advantage of the three-part modular lamination model of this invention. Even further oxygen barrier layers may be included in the second pre-laminated material in order to enhance the total barrier performance of the final laminated material.

EXAMPLES AND DESCRIPTION OF PREFERRED EMBODIMENTS

Figure 1B:
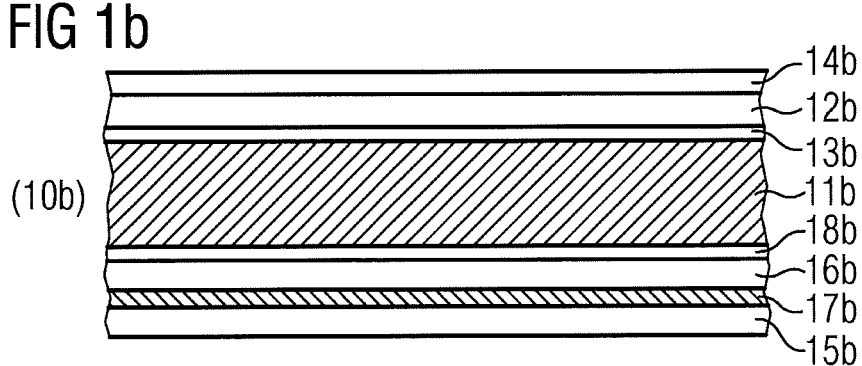
Figure 1C:
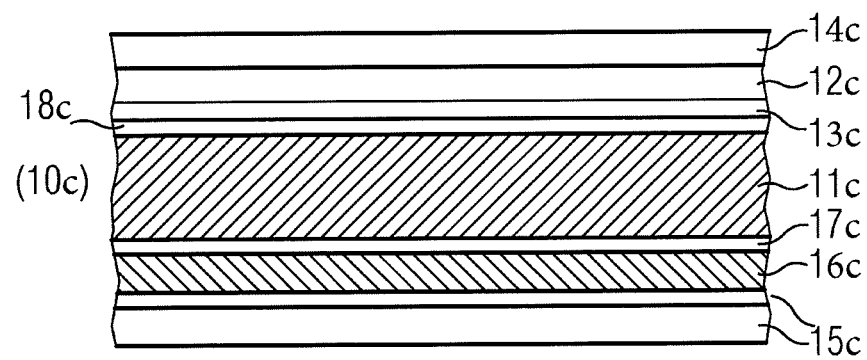
Figure 2A:
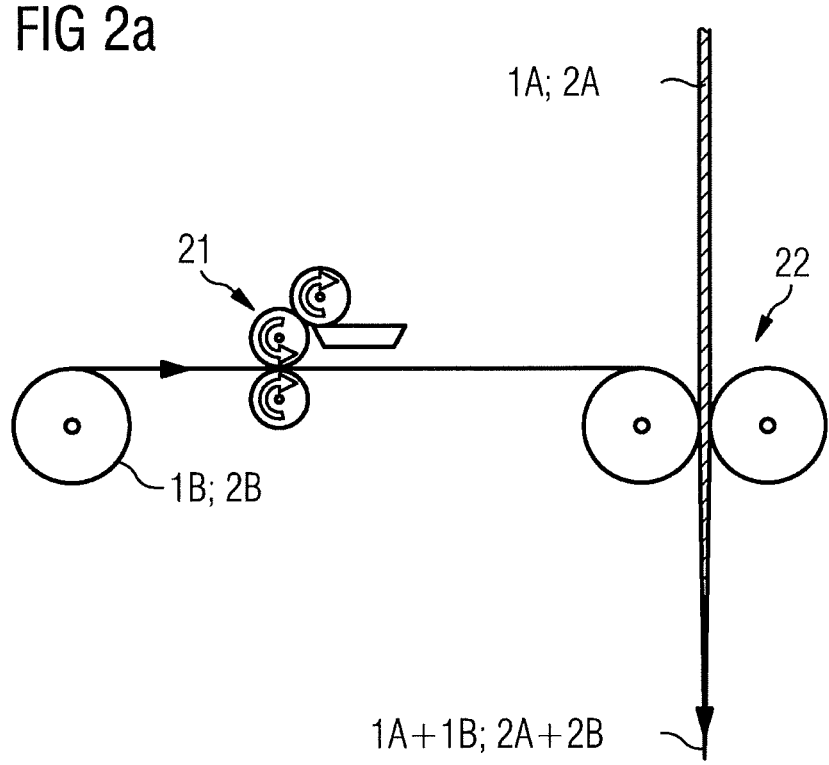
Figure 2B:
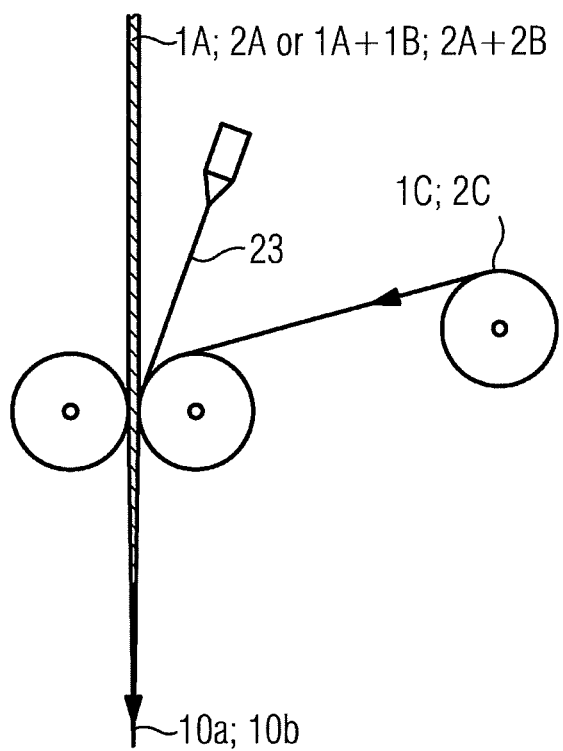
Figure 3A:
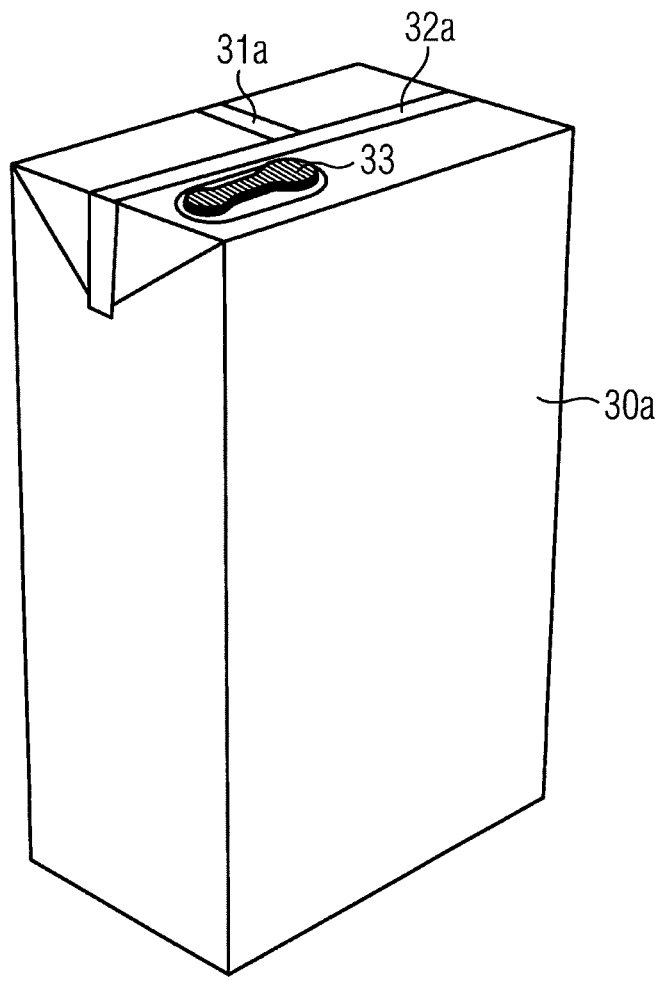
Figure 3B:
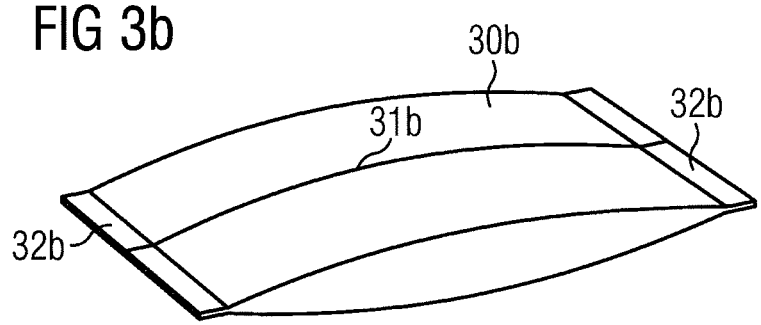
Figure 3C:
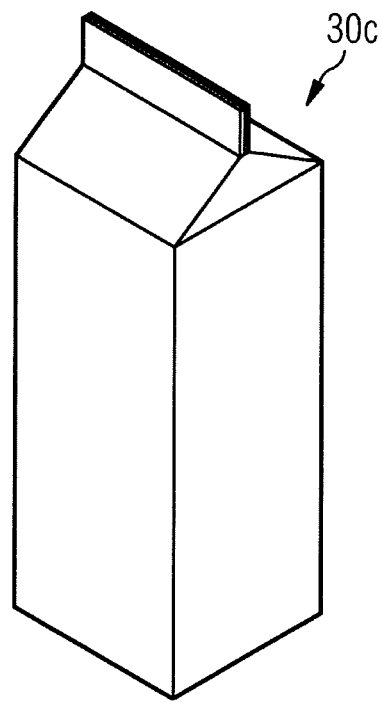
Figure 3D:
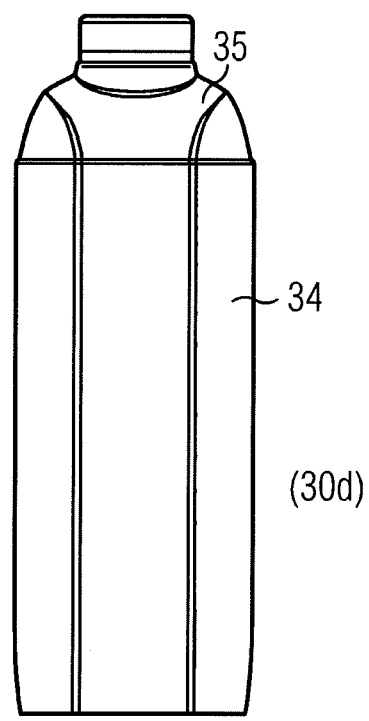
Figure 4:
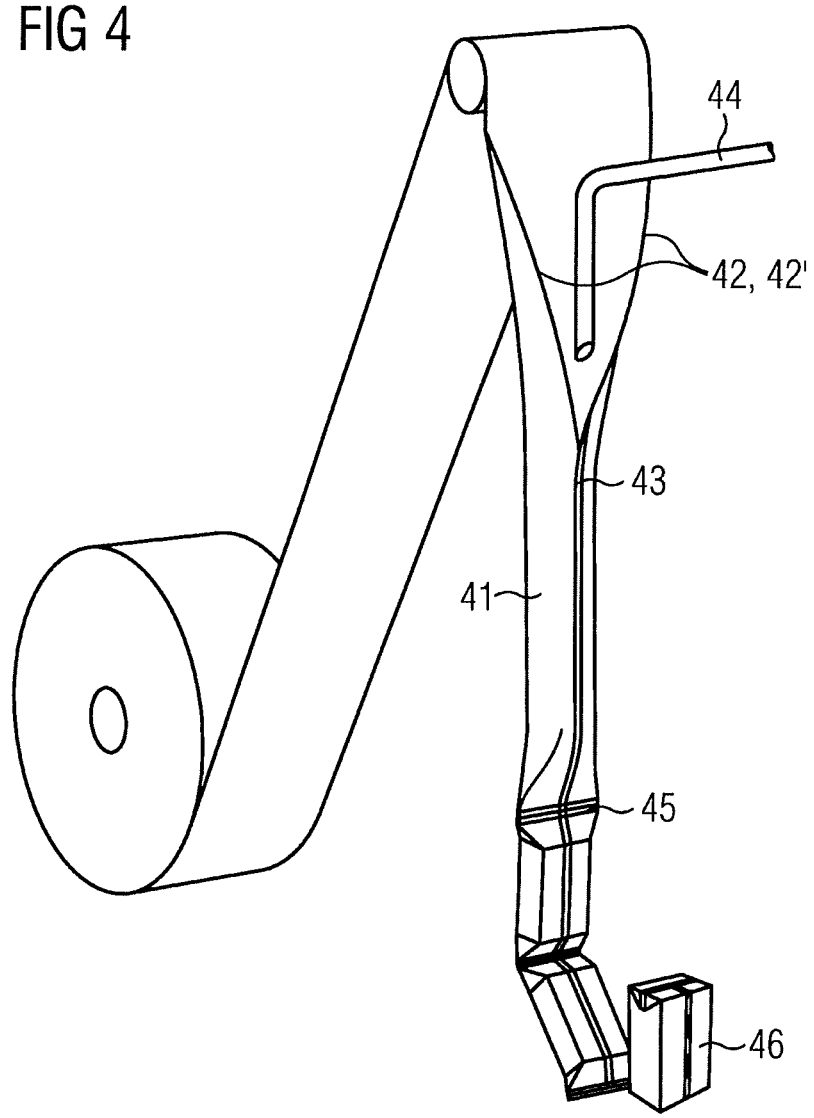

In the following, preferred embodiments of the invention will be described with reference to the drawings, of which:

FIG. 1a is showing a schematic, cross-sectional view of a specific example of a laminated packaging material which has a compact-surface barrier paper layer according to the invention, FIG. 1b shows a schematic, cross-sectional view of a further such specific embodiment of a laminated packaging material with a compact-surface barrier paper layer, FIG. 1c shows a schematic, cross-sectional view of yet a further specific embodiment of a laminated packaging material with a compact-surface barrier paper layer, FIG. 2a shows schematically a lamination operation of the method of the invention, FIG. 2b shows schematically an example of a different lamination operation, which may be combined with the method of the invention, FIG. 3a, 3b, 3c, 3d show typical examples of packaging containers produced from the laminated packaging material according to the invention, and FIG. 4 shows the principle of how packaging containers may be manufactured from the packaging laminate in a continuous, roll-fed, form, fill and se al process.

In FIG. 1a, there is thus shown, in cross-section, a first embodiment of a laminated packaging material, 10a, of the invention. It comprises a bulk material layer 11a of a paperboard or other cellulose-based material.

On the inside, of the bulk layer 11a, the laminated material comprises a thin and high-density paper layer 12a, having a barrier coating 13a applied onto it, in this particular example a metallised coating. The paper layer 12a is a thin, high-density compact-surface barrier paper layer having a surface roughness of lower than 300 Bendtsen ml/min, such as lower than 250 ml/min. In particular, here a greaseproof paper of the type Super Perga WS Parchment with grammage 32 g/m$^2$ and surface roughness of about 200 ml/min, from Nordic Paper was used.

The packaging material also comprises an innermost, heat sealable thermoplastic layer 14a, which is the layer of the packaging laminate that will be in direct contact with the filled food product in a final packaging container. The innermost, heat sealable polymer layer 14a is applied onto the inside of the bulk material layer by means of melt extrusion coating, or melt co-extrusion coating of a multi-layer polymer structure.

The barrier paper 12a, 13a on the inside of the bulk material layer may be first coated with one or more further barrier coatings. In an alternative embodiment it may first be pre-coated with a PVOH barrier polymer, applied onto the paper surface layer 12a by means of an aqueous dispersion in a preceding coating and drying operation. Subsequently, a metallisation coating 13a may then be applied on top of the pre-coating surface. The barrier coated barrier paper 12a is directed in the laminate such that the barrier coatings are facing outwards (i.e. towards the exterior, being the inside of a package from the laminated packaging material) in the packaging laminate. In an alternative embodiment, the paper 12a provides some barrier properties in itself, when laminated between polymer layers, such that it may be uncoated and still provide some barrier properties and thus be the barrier layer without any further barrier coating. In a further alternative embodiment, a metallised barrier-coated paper may be turned in the other direction in the laminate, such that the metallisation faces towards the interior of the laminate, i.e. towards the bulk material layer.

The (co-)extrusion coating of the innermost layer 14a may be done before or after lamination of the barrier paper 12a to the spacer layer 11a. The innermost heat sealable layer or multilayer 14a may alternatively be applied in the form of a pre-manufactured film, adding further stability and durability by being an oriented film to a higher degree than what is obtainable in extrusion coating operations. Again, the inside material layers may be pre-laminated as a separate module inside, before laminating it to the spacer layer 11c. In this particular embodiment, however, the barrier-coated paper 12a-13a is first laminated to the bulk material layer 11a, or the rest of the laminated material. Subsequently, the bulk material layer is melt extrusion coated on the inner side the layer or multilayer 14a of a heat sealable polymer being a polyolefin, being a low density polyethylene composition comprising a blend of a metallocene-catalysed linear low density polyethylene (m-LLDPE) and a low density polyethylene (LDPE).

On the other side, the outside of the metallised barrier paper layer 12a, 13a, the packaging material comprises an outermost liquid-tight and transparent layer 15a of a plastic, preferably a heat sealable thermoplastic, such as a polyolefin, such as a polyethylene material layer. The print substrate and metallised barrier paper 12a, 13a, may be printed before or after coating with the outermost plastic layer 15a is applied onto the printed barrier paper substrate layer 12a, 13a in a separate operation before or after lamination to the bulk material layer 11a.

The lamination of the print substrate and barrier paper layer 12a, 13a to the bulk material layer 11a is carried out by applying a low amount of an aqueous composition of an adhesive that is partly absorbed into the respective celllulose layers and efficiently adheres the two paper-cellulose layers together, the adhesive binder polymer being starch or nano-/micro-fibrillar cellulose or polyvinyl alcohol/polyvinyl acetat or similar hydrophilic substances, which readily bond to cellulose molecules. When the adhesive material has inherent barrier properties, of course such an adhesive binder polymer, although applied by a very low amount, may contribute even further to the resulting oxygen barrier properties of the laminated packaging material.

In FIG. 1b, a cross-section, of a second embodiment of a laminated packaging material, 10b, is shown. It is in principle a laminate composed from three initial modules of material layers that contribute to the sandwich structure that substantially provides the laminated material with its mechanical strength properties and provides a final packaging container with dimensional stability. Module 1A is a center layer of a bulk material from a spacer layer 11b of low-density or low-grade cellulose material, such as a foam-formed fibrous cellulose layer or a layer of a fluting material.

The outside material module 1B comprises a print substrate layer of a thin, high-density paper 12b having a print surface. The paper 12b also constitutes a facing layer on the outside of the sandwich structure in interaction with the spacer layer 11b. In the final laminated material, the substrate 12b is printed and decorated with a print pattern from various colours, images and text. The outside material module 1B also comprises an outermost liquid-tight and transparent layer 14b of a plastic, preferably a heat sealable thermoplastic, such as a polyolefin, such as a polyethylene material layer. The print substrate and paper facing layer 12b may be printed before or after lamination to the center spacer layer, and the outermost plastic layer 14b is applied onto the printed substrate layer in a separate operation before or after lamination to the spacer layer 11b. If decor printing coating with the plastic layer 14b takes place before lamination to the center module spacer layer, the whole outside material module is thus prepared as one module, i.e. as a pre-laminated outside, which is then laminated to the center module or to the rest of the laminate, on the outside of the center spacer layer.

The lamination operation of the print substrate paper facing layer 12b to the center module spacer layer 11b is carried out by applying a low amount of an aqueous composition of an adhesive binder polymer that is partly absorbed into the respective cellulose layers and efficiently adheres the two paper-cellulose layers together, the adhesive being starch or nano-/micro-fibrillar cellulose or polyvinyl alcohol/polyvinyl acetat or similar renewable/biodegradable substances, which are able to bond well to cellulose molecules.

The inside material module 2C, on the other side, the inside, of the center module 2A, comprises a barrier film 16b, being a polymer substrate film with a barrier coating applied onto a side. The inside material module also comprises an innermost, heat sealable thermoplastic layer 15b, which is also the layer of the packaging laminate that will be in direct contact with the filled food product in a final packaging container. The innermost, heat sealable polymer layer 15b may applied onto the barrier film by means of melt extrusion coating, or melt co-extrusion coating of a multilayer polymer structure onto the inside of the barrier film 16b. The barrier coating is in this embodiment provided with a vapour deposition barrier coating, applied onto the polymer film substrate by means of vapour deposition coating in a preceding vapour deposition operation. The barrier coating is in this embodiment a metallisation coating applied by means of physical vapour depostion, however not shown in the figure. The barrier coated film may alternatively be directed in the laminate such that the barrier coating is facing outwards in the packaging laminate, towards the center module and paper facing layer 12b, but in this particular embodiment it is directed inwards, towards the innermost sealing layer. The (co-)extrusion coating of the innermost layer 15b may be done before or after lamination of the inside material module 2C to the center module 2A. The innermost heat sealable layer or multilayer 15b may alternatively be applied in the form of a pre-manufactured film, adding some further stability and durability by being a mono- or biaxially oriented film to a higher degree than what is obtained in extrusion coating operations. Again, the inside material module 2C may be pre-laminated as a separate module inside, before laminating it to the center module 2A.

In this particular embodiment, however, the barrier-coated film 16b is first laminated to the bulk material, or the rest of the laminated material, i.e. modules 2A laminated to outside module 2B, and subsequently melt extrusion coated on the inner side of the barrier-coated film with the layer or multilayer 15b of a heat sealable polymer being a polyolefin, being a low density composition comprising a blend of a metallocene-catalysed linear low density polyethylene (m-LLDPE) and a low density polyethylene (LDPE).

The lamination operation of laminating the barrier substrate film 16b to the bulk material layer 11b, may be carried out by first applying from 1 to 2 g/m$^2$, i.e. about 1.5 g/m$^2$, of an aqueous dispersion of an ethylene acrylic acid copolymer, having a dry content of about 45 wt %, onto the surface of the free side of the barrier film 16b, and subsequently pressing the inside of the bulk material layer against the surface of the adhesive-coated barrier film, and thus laminating the layers to each other with the aqueous adhesive composition coating providing interjacent bonding between the layers.

The print substrate 12b normally has a printed décor pattern onto the surface, which pattern is not shown in FIG. 1b, however. Alternatively, the print substrate may be a coloured or metallised polymer film.

The barrier substrate 16b may alternatively be a barrier-coated paper, such as a metallised paper.

In FIG. 1c a cross-section, of a third embodiment of a laminated packaging material, 10c, is shown.

Thus provided are a first web A comprising a layer of a liquid carton paperboard 11c and a second web of a metallised polymer film 12c, intended for the outside of the packaging material, such as an oriented polypropylene (OPP, BOPP) or an oriented PET film. An aqueous composition comprising an adhesive is applied 21 onto the metallised surface 13c of the metallised film during forwarding thereof. The two webs 11c; A, 12c; B are forwarded towards a pressure roller nip 22, while the second web has the aqueous adhesive 18c applied to its surface, and are joined and laminated together by the interjacent aqueous adhesive composition while passing the nip, while the adhesive composition is partly absorbed into the first web 11c. There is no need for forced drying or heat curing of the aqueous adhesive composition, and the lamination speed can be held high, on par with normal lamination speeds of above 300 m/min, or above 400 m/min or even above 500 m/min. In particular, in this embodiment, the web of layer 11c is a conventional, clay-coated paperboard of the type suitable for liquid carton packaging. The clay-coated surface, partly absorbs the aqueous adhesive composition equally well as a cellulose fibre network, without such a coating. The metallised surface of the film web 12c; B has a high smoothness such that the application of a thin film of the liquid adhesive provides an even wet coating thereof, and ensures a controlled and uniform (over the whole surface) absorption of the adhesive composition into the opposite surface to be adhered in the pressure nip 22, i.e. into the clay-coated paperboard of the web A. The adhesive binder polymer is an ethylene acrylic acid copolymer (EAA) dispersion in water, with a solids content from 40 to 50 weight-% and is applied at an amount of about 2 g/m$^2$ dry content.

The laminated paperboard and outside metallised film 11c, 12c-13c; A+B are then wound up onto reels and produced in large quantities for intermediate storage on reels. When it is time for the manufacturing of a laminated packaging material having a metallised film 12c-13c as the print substrate, the paperboard-metallised film lamiante is unwound from its reel, and led to a printing station for the conventional printing of the decorative pattern on the film side, thus obtaining the metallised, shiny decor background. Subsequently, the printed material is further laminated to outermost 14c and innermost 15c heat-sealable, liquid-tight and protective thermoplastic polymer layers by extrusion coating or film lamination in the usual manner, including the lamination to a barrier material layer 16c, such as an aluminium foil, on the inside of the bulk paperboard layer 11c, between the paperboard and the innermost thermoplastic layer 15c, i.e. on the side of the paperboard layer which is opposite to the printed, decorative, outer side. The barrier layer 16c is bonded to the paperboard layer 11c by means of a bonding layer 17c of a thermoplastic polymer, such as a polyolefin, such as polyethylene. The innermost heat sealable layer is bonded to the barrier layer, the aluminium foil by means of an adhesive polymer, such as EAA, which is coextrusion coated together with the innermost heat sealable polymer, i.e. as a two layer configuration of heat sealable olefin-based polymers 15c.

The adhesion obtained between the outside metallised film 12c-13c and the paperboard 11c is above 100 N/m and has proven to be well as strong as needed throughout lamination manufacturing, intermediate reel storage of the laminated material, further printing and lamination steps, as well as throughout the manufacturing of fold-formed, filled and sealed liquid food packaging containers, from the laminated material. The advantages therefrom are great and simplifies the packaging laminate manufacturing process a great deal. Hitherto, the lamination of metallised film to paperboard had to take place by melt extrusion lamination with an interjacent layer of about 15 g/m2 of low density polyethylene (LDPE), which is of course considerably more expensive from a raw material cost point of view. Furthermore, the metallised film, which is thin and delicate to handle during lamination, is exposed to a significant heat load from the hot molten, extruded LDPE, at about 280-320° C., while the film web is moving under tension into a cooled press roller nip. Any defects due to this rough handling can be avoided by a method as described above. Any subsequent heat lamination step takes place when the film is already adhered and set to the paperboard, and it is therefore not nearly as vulnerable to similar heat loads later in the manufacturing process.

In FIG. 2a it is schematically illustrated how one layer or module of layers may be laminated to another layer/module by cold aqueous adhesive absorption lamination, such that a very low amount of an aqueous adhesive solution is applied onto one of the surfaces to be laminated to each other, the aqueous adhesive solution then being absorbed into one or both of the two surfaces while adhering them together under the application of pressure. Thus, in the embodiments for manufacturing the laminated packaging materials in FIGS. 1a-1b, an aqueous adhesive solution is applied onto the surface to be laminated, of the outside layer/material module 1B; 2B representing the layer(s) on the outside of the bulk and spacer layer, i.e. onto the non-print surface of the print substrate layer 16a; 16b, in an adhesive application operation 21. At a lamination nip between two nip rollers, a web of the center module material 1A; 2A representing the bulk layer comprising the spacer layer, is laminated at lamination station 22 to a web of the outside module material 1B; 2B under simultaneous forwarding of the two webs through the lamination nip, at a pressure sufficiently high for adhering the two surfaces together, but not so high that the low density spacer layer of the sandwich structure is collapsed. The obtained web of the intermediate pre-laminate of two layers/modules 1A+1B; 2A+2B is forwarded to a further lamination station for lamination to the third module or parts of it as will be described herein below in FIG. 2b, or alternatively wound up onto a reel for intermediate storage or transport to a different time or place, where the final lamination and finishing steps will take place. The cold aqueous adhesive absorption lamination method may also or alternatively be applied when laminating the inside material module 1C; 2C to the center layer/module material or pre-laminated center and outside modules.

In FIG. 2b it is schematically illustrated how one layer/module may be laminated to another layer/module by melt extrusion lamination such that the two surfaces to be laminated are bonded to each other by an intermediate thermoplastic bonding layer. According to this example, the web of the pre-laminate of the two modules laminated in the example of FIG. 2a is forwarded to a lamination nip at the same time as a web of the inside material module 1C; 2C. At the same time, a molten curtain of a thermoplastic bonding polymer 23; 19a; 19b is extruded down into the lamination roller nip, and being cooled while pressing the two webs together, such that sufficient adhesion is obtained between the cellulose-based center module, i.e. the surface of the spacer layer 11a; 11 and the barrier paper 13a; 13b of the inside material module.

FIG. 3a shows an embodiment of a packaging container 30a produced from the packaging laminate 10a; 10b; 10c; 10d according to the invention. The packaging container is particularly suitable for beverages, sauces, soups or the like. Typically, such a package has a volume from about 100 to 1000 ml. It may be of any configuration, but is preferably brick-shaped, having longitudinal and transversal seals 31a and 32a, respectively, and optionally an opening device 33. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 3b shows an alternative, preferred example of a packaging container 30b produced from an alternative packaging laminate according to the invention. The alternative packaging laminate is thinner by having a thinner cellulose bulk layer 11, and thus it is not dimensionally stable enough to form a cuboid, parallellepipedic or wedge-shaped packaging container, and is not fold formed after transversal sealing 32b. It will thus remain a pillow-shaped pouch-like container and be distributed and sold in this form.

FIG. 3c shows a gable top package 30c, which is fold-formed from a pre-cut sheet or blank, from the laminated packaging material comprising a bulk layer of paperboard and the durable barrier film of the invention. Also flat top packages may be formed from similar blanks of material.

FIG. 3d shows a bottle-like package 30d, which is a combination of a sleeve 34 formed from a pre-cut blanks of the laminated packaging material of the invention, and a top 35, which is formed by injection moulding plastics in combination with an opening device such as a screw cork or the like. This type of packages are for example marketed under the trade names of Tetra Top® and Tetra Evero®. Those particular packages are formed by attaching the moulded top 35 with an opening device attached in a closed position, to a tubular sleeve 34 of the laminated packaging material, sterilizing the thus formed bottle-top capsule, filling it with the food product and finally fold-forming the bottom of the package and sealing it.

FIG. 4 shows the principle as described in the introduction of the present application, i.e. a web of packaging material is formed into a tube 41 by the longitudinal edges 42 of the web being united to one another in an overlap joint 43. The tube is filled 44 with the intended liquid food product and is divided into individual packages by repeated transversal seals 45 of the tube at a pre-determined distance from one another below the level of the filled contents in the tube. The packages 46 are separated by incisions in the transversal seals and are given the desired geometric configuration by fold formation along prepared crease lines in the material.

We have accordingly seen that the new method of the invention, also enables the providing of packaging containers with good integrity properties also under wet conditions, i.e. for the packaging of liquid or wet food products with long shelf life.

Generally, the grammages mentioned in the above and following description are as measured by SCAN P 6:75. The material densities and layer thicknesses were measured as by ISO 534:1988.

The invention is not limited by the embodiments shown and described above, but may be varied within the scope of the claims. As a general remark, the relative proportions of layers, distances between layers and the size of other features and their relative size in comparison with each other, should not be taken to be as shown exactly as in the figures, which are merely illustrating the order and type of layers in relation to each other, all other features to be understood as they are described in the text specification.

The invention claimed is:

1. Method of manufacturing a laminated packaging material for liquid food carton packaging, the method comprising:
   providing a first web comprising a layer A of paper or paperboard or other cellulose-based material,
   providing a second web comprising a film or sheet B,
   applying an aqueous composition comprising an adhesive, at an amount from 1 to 4 g/m², dry content, onto the surface of one of the first and second webs,
   forwarding the first and second webs, one of which having the aqueous adhesive composition applied to its surface, towards a pressure roller nip to be joined and laminated together by the interjacent aqueous adhesive composition while passing the nip, and while the aqueous adhesive composition is partly absorbed into at least one of the first and second web surfaces of A and B, and wherein there is no forced drying or curing or crosslinking of the applied aqueous adhesive composition,
   applying two heat sealable thermoplastic layers so that the first web comprising the layer A of paper or paperboard or other cellulose-based material and the second web comprising the film or sheet B are positioned between the two heat sealable thermoplastic layers and so that the two heat sealable thermoplastic layers are outermost layers in the laminated packaging material, and
   winding the first and second webs which have been joined and laminated together by the interjacent aqueous adhesive composition after passing through the pressure roller nip onto a reel, and the applying of the two heat sealable thermoplastic layers occurring after the first and second webs which have been joined and laminated together by the interjacent aqueous adhesive composition are unwound from the reel.

2. Method as claimed in claim 1, wherein the lamination is taking place at ambient temperature.

3. Method as claimed in claim 1, wherein the layer A is a bulk layer in the laminated packaging material.

4. Method as claimed in claim 1, wherein the aqueous adhesive composition comprises an adhesive binder polymer selected from the group consisting of polyvinyl alcohol (PVOH), polysaccharides and polysaccharide derivatives.

5. Method as claimed in claim 1, wherein the second web of the film or sheet B has a surface roughness of 200 Bendtsen or lower, as defined by SCAN (Scandinavian Pulp and Paper Norms) P21-67 and in TAPPI UM535 (ISO 8791-2), and wherein the aqueous adhesive composition is applied onto the second web.

6. Method as claimed in claim 5, wherein the aqueous adhesive composition comprises an acrylic-modified polyolefin adhesive polymer, and the aqueous adhesisve composition has a solids content from 30 to 50 weight %.

7. Method as claimed in claim 5, wherein the aqueous adhesive composition comprises an adhesive binder polymer and the amount of applied adhesive binder polymer is from 0.5 to 2 g/m$^2$.

8. Method as claimed in claim 1, wherein the web of film or sheet B is a paper or paperboard or cellulose-based layer, and the aqueous adhesive composition comprises an adhesive binder polymer selected from PVOH, polyvinyl acetate, starch or starch derivatives and cellulose or cellulose derivatives.

9. Method as claimed in claim 5, wherein the aqueous adhesive composition comprises an adhesive binder polymer and the adhesive binder polymer is applied at an amount from 1 to 3 g/m$^2$, dry content.

10. Method as claimed in claim 1, wherein the layer A has a moisture content from 5 to 10%.

11. Method as claimed in claim 1, wherein the layer A has a surface roughness of 300 Bendtsen or higher, as defined by SCAN (Scandinavian Pulp and Paper Norms) P21-67 and in TAPPI UM535 (ISO 8791-2).

12. Method as claimed in claim 1, wherein a web speed of lamination through the roller nip is at least 200 m/min.

13. Method as claimed in claim 1, wherein the adhesion between layer A and film or sheet B is at least 60 N/m.

14. Method as claimed in claim 1, wherein the film or sheet B is laminated to the outside of layer A so that the film or sheet B is on an outside of a packaging container made from the packaging material, and comprises a print substrate or a pre-laminated structure comprising a print substrate comprising a printed decorative pattern, and an outer transparent, protective polymer layer.

15. Method as claimed in claim 1, wherein the film or sheet B is laminated to the inside of layer A so that the film or sheet B is on inside of a packaging container made from the packaging material, and comprises at least one barrier layer or barrier coating.

16. Method as claimed in claim 1, wherein the layer A has a moisture content from 5.5 to 7.5%.

17. Method of manufacturing a laminated packaging material configured to be converted into liquid food carton packaging, the laminated packaging material that is converted into liquid food carton packaging comprising multiple layers, the method comprising:

providing a first web comprising a layer A of paper or paperboard or other cellulose-based material, the layer A of the paper or paperboard or other cellulose-based material being the thickest of all of the multiple layers of the laminated packaging material and contributing most to mechanical properties and dimensional stability of the laminated packaging material, the layer A having a moisture content from 5% to 10% and a surface roughness of 300 Bendtsen or higher as defined by SCAN (Scandinavian Pulp and Paper Norms) P21-67 and in TAPPI UM535 (ISO 8791-2);

providing a second web comprising a film or sheet B, the second web comprising the film or sheet B being a metallised polymer film;

applying an aqueous composition comprising an adhesive, at an amount from 1 to 4 g/m$^2$, dry content, onto the surface of one of the first and second webs;

forwarding the first and second webs, one of which has the aqueous adhesive composition applied to its surface, towards a pressure roller nip to be joined and laminated together by the interjacent aqueous adhesive composition while passing the nip, and while the aqueous adhesive composition is partly absorbed into at least one of the first and second web surfaces of A and B;

after the applying of the aqueous adhesive composition onto the surface of one of the first and second webs there is no forced drying or curing or crosslinking of the applied aqueous adhesive composition; and applying two heat sealable thermoplastic layers so that the first web comprising the layer A of paper or paperboard or other cellulose-based material and the second web comprising the film or sheet B are positioned between the two heat sealable thermoplastic layers and so that the two heat sealable thermoplastic layers are outermost layers of the multiple layers of the laminated packaging material, and winding the first and second webs which have been joined and laminated together by the interjacent aqueous adhesive composition after passing through the pressure roller nip onto a reel, and the applying of the two heat sealable thermoplastic layers occurring after the first and second webs which have been joined and laminated together by the interjacent aqueous adhesive composition are unwound from the reel.

18. Method as claimed in claim 17, wherein the aqueous adhesive composition comprises an adhesive binder polymer selected from the group consisting of polyvinyl alcohol (PVOH), polysaccharides and polysaccharide derivatives.

19. Method of manufacturing a laminated packaging material configured to be converted into liquid food carton packaging, the laminated packaging material that is converted into liquid food carton packaging comprising multiple layers, the method comprising:

providing a first web comprising a layer A of paper or paperboard or other cellulose-based material, the layer A of the paper or paperboard or other cellulose-based material being the thickest of all of the multiple layers of the laminated packaging material and contributing most to mechanical properties and dimensional stability of the laminated packaging material, the layer A having a moisture content from 5% to 10% and a surface roughness of 300 Bendtsen or higher as defined by SCAN (Scandinavian Pulp and Paper Norms) P21-67 and in TAPPI UM535 (ISO 8791-2);

providing a second web comprising a film or sheet B;

applying an aqueous composition comprising an adhesive, at an amount from 1 to 4 g/m$^2$, dry content, onto the surface of one of the first and second webs;

forwarding the first and second webs, one of which has the aqueous adhesive composition applied to its surface, towards a pressure roller nip to be joined and laminated together by the interjacent aqueous adhesive composition while passing the nip, and while the aqueous adhesive composition is partly absorbed into at least one of the first and second web surfaces of A and B;

after the applying of the aqueous adhesive composition onto the surface of one of the first and second webs there is no forced drying or curing or crosslinking of the applied aqueous adhesive composition;

applying two heat sealable thermoplastic layers so that the first web comprising the layer A of paper or paperboard or other cellulose-based material and the second web comprising the film or sheet B are positioned between the two heat sealable thermoplastic layers and so that the two heat sealable thermoplastic layers are outermost layers of the multiple layers of the laminated packaging material; and winding the first and second webs which have been joined and laminated together by the interjacent aqueous adhesive composition after passing through the pressure roller nip onto a reel, and the applying of the two heat sealable thermoplastic layers occurring after the first and second webs which have been joined and laminated together by the interjacent aqueous adhesive composition are unwound from the reel.

* * * * *